United States Patent
Robèrt et al.

(10) Patent No.: US 12,246,867 B2
(45) Date of Patent: Mar. 11, 2025

(54) ROBOT SYSTEM AND METHOD FOR COIL PACKAGING

(71) Applicant: Lamiflex Group AB, Nyköping (SE)

(72) Inventors: Adrian Robèrt, Lidingö (SE); Petter Järte, Bromma (SE); Marcus Forssblad, Stigtomta (SE); Fredrik Rosenlind, Nyköping (SE); Kristoffer Olsson, Nyköping (SE)

(73) Assignee: Lamiflex Group AB, Nyköping (SE)

( * ) Notice: Subject to any disclaimer, the term of this patent is extended or adjusted under 35 U.S.C. 154(b) by 18 days.

(21) Appl. No.: 18/267,085

(22) PCT Filed: Dec. 23, 2021

(86) PCT No.: PCT/SE2021/051310
§ 371 (c)(1),
(2) Date: Jun. 13, 2023

(87) PCT Pub. No.: WO2022/139673
PCT Pub. Date: Jun. 30, 2022

(65) Prior Publication Data
US 2024/0051692 A1   Feb. 15, 2024

(30) Foreign Application Priority Data
Dec. 23, 2020   (SE) .................................. 2051554-0

(51) Int. Cl.
*B65B 11/04*   (2006.01)
*B25J 9/00*   (2006.01)
(Continued)

(52) U.S. Cl.
CPC .............. *B65B 11/04* (2013.01); *B25J 9/0084* (2013.01); *B25J 11/005* (2013.01); *B65B 41/12* (2013.01)

(58) Field of Classification Search
CPC ...... B25J 9/0084; B25J 9/1682; B25J 9/1669; B25J 11/005; B25J 15/0683;
(Continued)

(56) References Cited

U.S. PATENT DOCUMENTS

| | | |
|---|---|---|
| 4,631,898 A | 12/1986 | Brambilla |
| 5,086,983 A * | 2/1992 | Darrieux ............... B29C 53/588 |
| | | 242/434.8 |

(Continued)

FOREIGN PATENT DOCUMENTS

| | | |
|---|---|---|
| DE | 1192094 B | 4/1965 |
| FR | 2537556 A1 | 6/1984 |

(Continued)

OTHER PUBLICATIONS

International Search Report and Written Opinion received for PCT Patent Application No. PCT/SE2021/051310, mailed on Mar. 14, 2022, 14 pages.

(Continued)

*Primary Examiner* — Dariush Seif
(74) *Attorney, Agent, or Firm* — MEDLER FERRO WOODHOUSE & MILLS PLLC

(57) ABSTRACT

A robot system and a method for packaging coils of sheet metal is provided. The method and robot system for coil packaging, having two industrial robots, each robot being provided with a robot arm provides for a solution where the direction of travel along the envelope surface of the coil is inclined relative the rotational axis of the coil, positioning of the roll of wrapping material in three-dimensional along the circumferential edge may be adjusted for each pass and/or where the positioning of the longitudinal axis of the roll or wrapping material is in an inclined angular direction relative the direction of rotation.

27 Claims, 4 Drawing Sheets

(51) Int. Cl.
*B25J 11/00* (2006.01)
*B65B 41/12* (2006.01)

(58) Field of Classification Search
CPC ... B25J 15/0616; B25J 15/0052; B65B 41/12; B65B 11/04; B65B 11/045; B65B 25/146; B65B 57/12; B65B 61/06; B65B 27/06; B65B 13/181
See application file for complete search history.

(56) References Cited

U.S. PATENT DOCUMENTS

| | | | | |
|---|---|---|---|---|
| 5,507,442 | A * | 4/1996 | Konno | H01F 41/08 29/605 |
| D438,220 | S | 2/2001 | Ishibashi et al. | |
| D440,988 | S | 4/2001 | Ishibashi et al. | |
| 6,324,820 | B1 * | 12/2001 | Gelfman | B65B 25/24 53/399 |
| D457,900 | S | 5/2002 | Hanne et al. | |
| D482,051 | S | 11/2003 | Hanne et al. | |
| 6,705,060 | B1 * | 3/2004 | McGuinness | B65B 25/24 53/409 |
| 6,973,764 | B2 * | 12/2005 | Bordner | B65H 75/185 53/409 |
| 8,695,318 | B2 * | 4/2014 | Ogawa | B29D 30/48 57/11 |
| D748,705 | S | 2/2016 | Sekido et al. | |
| 9,624,070 | B2 * | 4/2017 | Yoshida | B65H 81/00 |
| D810,801 | S | 2/2018 | Hsu et al. | |
| D819,102 | S | 5/2018 | Kobayashi et al. | |
| D884,757 | S | 5/2020 | Fujii | |
| 11,142,359 | B2 * | 10/2021 | Stone | B65B 25/148 |
| D980,299 | S | 3/2023 | Järte et al. | |
| 2001/0030256 | A1 * | 10/2001 | Araujo | B65B 25/24 242/434.5 |
| 2007/0222245 | A1 | 9/2007 | Maffeis | |
| 2009/0308267 | A1 * | 12/2009 | Song | B21C 47/24 100/29 |
| 2016/0272351 | A1 * | 9/2016 | Faehrenkaemper | B65B 25/24 |
| 2018/0072441 | A1 * | 3/2018 | Tegström | B65B 25/24 |
| 2021/0122562 | A1 * | 4/2021 | Casas | B65D 85/672 |
| 2023/0227188 | A1 * | 7/2023 | Olsson | B65B 25/146 53/399 |
| 2024/0051692 | A1 * | 2/2024 | Robert et al. | B65B 25/24 |
| 2024/0084610 | A1 * | 3/2024 | Ghaemi osguoie | B25J 9/0084 |

FOREIGN PATENT DOCUMENTS

| | | |
|---|---|---|
| GB | 1014463 A | 12/1965 |
| KR | 10-2011-0137880 A | 12/2011 |
| KR | 10-2019-0047962 A | 5/2019 |
| KR | 10-2028468 B1 | 10/2019 |
| KR | 10-2020-0035519 A | 4/2020 |
| KR | 10-2020-0074765 A | 6/2020 |
| SK | 279238 B6 | 8/1998 |
| WO | 01/70575 A1 | 9/2001 |
| WO | 2016/195578 A1 | 12/2016 |
| WO | 2020/193868 A1 | 10/2020 |
| WO | 2021/219861 A2 | 11/2021 |

OTHER PUBLICATIONS

CA Office Action Mailed on Sep. 17, 2024 for CA Application No. 3200269, 4 page(s).

* cited by examiner

ROBOT SYSTEM AND METHOD FOR COIL PACKAGING

CROSS-REFERENCE TO PRIOR APPLICATIONS

This application is a § 371 National Stage Application of PCT International Application No. PCT/SE2021/051310 filed Dec. 23, 2021, which claims priority to Swedish Patent Application No. 2051554-0 filed Dec. 23, 2020, both of which are incorporated herein in their entirety.

TECHNICAL FIELD

In general, the present disclosure relates to apparatus, system and methods for packaging articles with wrapping material. More specifically, the present disclosure relates to a robot system, a computer program product and method for packaging annular articles, such as coils of sheet metal, being rotated while being packaged with a wrapping material.

BACKGROUND

The wrapping of coils of sheet metal is generally time consuming in the production of sheet metal. Different solutions for automatized coil wrapping are available. Although working well, there is a demand for increasing the efficiency in the coil wrapping stage and to reduce the risk that creases are formed in the film applied to the envelope surface of the coil to enable a faster wrapping of the coil and improved productivity.

RELATED ART

The patent publication WO2016/195578 shows a setup of linear robots configured for wrapping sheet metal coils.

Another patent publication U.S. Pat. No. 6,705,060B1 shows a similar setup of linear robots configured for wrapping sheet metal coils.

In the patent publication EP3070008A1 there is shown a setup of robots with more degrees of freedom rendering a more flexible configuration. However, this disclosure lacks the practical solutions to make such a configuration work well in practice.

OBJECT OF DISCLOSED EMBODIMENTS

The object of embodiments disclosed herein is to provide a robot tool, system and method that overcomes the drawbacks of the known related art.

SUMMARY

The technology disclosed relates to methods, a computer program product and a robot system for wrapping coils, including a robot control system for controlling the movements and positioning in three-dimensional space of at least two industrial robots each comprising at least one robot arm.

In embodiments, the technology disclosed relates to methods, a computer program product and a robot system for controlling the movements of at least two industrial robots used for wrapping, in successive wrapping turns, the surfaces of a coil with a wrapping material such as a stretch film. The robot system comprises a computer program product and a robot control system configured to control the movements and travel paths of the at least two industrial robots and the respective at least one robot arm.

In embodiments, the technology disclosed relates to methods and a robot system for coil packaging, having two industrial robots, each robot being provided with a robot arm and configured to adjust the position of the roll of wrapping material in three-dimensional for each wrapping turn and/or to position the longitudinal axis of the roll or wrapping material in an inclined angular direction relative the direction of rotation of the coil, at least during movement of the respective robot and robot arm holding the roll of wrapping material along the curved envelope surface of the coil.

According to embodiments, the robot control system comprises a computer program product with stored software code and instructions, which, when executed, control the movements and travel paths of the at least two industrial robots and the respective at least one robot arm so that the travel paths for consecutive wrapping turns/laps/passes are different in order to define a certain width of the overlap of the successive wrapping passes along the curved envelope surface taking into account the outer radius of the coil and the rotational speed of the coil, e.g. the rotational speed that a pair of coil rollers of the cradle carrying the coil gives the coil placed in the cradle.

The technology disclosed relates to a method and robot system for coil packaging, having two industrial robots, each robot being provided with a robot arm provides for a solution where the direction of travel along the envelope surface of the coil is inclined relative the rotational axis of the coil, positioning of the roll of wrapping material in three-dimensional along the circumferential edge may be adjusted for each pass and/or where the positioning of the longitudinal axis of the roll or wrapping material is in an inclined angular direction relative the direction of rotation.

In embodiments, the technology disclosed relates to a system and method for wrapping a coil in a robot system comprising a robot control system, a cradle for carrying the coil, two industrial robots, each industrial robot being provided with at least one robot arm having a coupling robot piece in form of a shaft having a longitudinal axis and configured to interface with and hold a roll of wrapping material, said method comprising wrapping the coil with the wrapping material being rolled off the roll in successive wrapping turns each comprising a sequence of robot movements including two handovers of the roll of wrapping material between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:

a. positioning, in three-dimensional space along and outside a first outer circumferential edge of the coil, the robot arm of a first robot holding the roll of wrapping material in a different position in three-dimensional space relative a corresponding position along and outside said first outer circumferential edge for the immediately preceding wrapping turn, and b. moving the respective robot and robot arm holding the roll of wrapping material along the curved envelope surface so that the direction of travel of the roll and the respective robot arm holding the roll along the curved envelope surface is in a direction at an angle relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece in form of a shaft having a longitudinal axis and configured to interface with and hold a roll of wrapping material, said method comprising wrapping the coil with the wrapping material being rolled off the roll in successive wrapping turns each comprising a sequence of robot movements including two handovers of the roll of wrapping material between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:

a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and b. positioning the robot arm of the respective robots so that the longitudinal axis of the shaft of the robot arm holding the roll is directed in an inclined angular direction relative the direction of rotation of the coil, and c. moving the respective robot and robot arm holding the robot tool along the curved envelope surface so that the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

Moving the respective robot and robot arm holding the roll along the curved envelope surface so that the direction of travel for the respective robot and robot arm holding the roll along the curved envelope is at an angular direction within the angle range of 0.1 to 15 degrees relative an axis along the curved envelope surface which is parallel to the rotational axis of the coil reduces the risk of creases being formed in the film applied to the curved envelope surface of the coil, providing for improved productivity and ensuring the sealed integrity of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece in form of a shaft having a longitudinal axis and configured to interface with and hold a roll of wrapping material, said method comprising wrapping the coil with the wrapping material being rolled off the roll in successive wrapping turns each comprising a sequence of robot movements including two handovers of the roll of wrapping material between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising:

a. moving the respective robot and robot arm holding the robot tool along the curved envelope surface so that the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

Moving the respective robot and robot arm holding the robot tool along the curved envelope surface so that the direction of travel for the respective robot and robot arm holding the robot tool along the curved envelope is at an angular direction within the angle range of 0.1 to 15 degrees relative an axis along the curved envelope surface which is parallel to the rotational axis of the coil reduces the risk of creases being formed in the film applied to the curved envelope surface of the coil, providing for improved productivity and ensuring the sealed integrity of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:

b. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and c. positioning the robot arm of the respective robots so that the longitudinal axis of the roll holder shaft of the robot tool holding the roll is directed in an inclined angular direction relative the direction of rotation of the coil, and d. moving the respective robot and robot arm holding the robot tool along the curved envelope surface so that the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising:
   a. moving the respective robot and robot arm holding the robot tool along the curved envelope surface so that the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

Moving the respective robot and robot arm holding the robot tool along the curved envelope surface so that the direction of travel for the respective robot and robot arm holding the roll along the curved envelope is at an angular direction within the angle range of 0.1 to 15 degrees relative an axis along the curved envelope surface which is parallel to the rotational axis of the coil reduces the risk of creases being formed in the film applied to the curved envelope surface of the coil, providing for improved productivity and ensuring the sealed integrity of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece in form of a shaft having a longitudinal axis and configured to interface with and hold a roll of wrapping material, said method comprising wrapping the coil with the wrapping material being rolled off the roll in successive wrapping turns each comprising a sequence of robot movements including two handovers of the roll of wrapping material between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:
   a. positioning, in three-dimensional space along and outside a first outer circumferential edge of the coil, the robot arm of a first robot holding the roll of wrapping material in a different position in three-dimensional space relative a corresponding position along and outside said first outer circumferential edge for the immediately preceding wrapping turn, and
   b. moving the respective robot and robot arm holding the roll of wrapping material along the curved envelope surface so that the direction of travel of the roll and the respective robot arm holding the roll along the curved envelope surface is in a direction at an angle relative an axis along the curved envelope surface which is parallel to the rotational axis of the coil, wherein the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece in form of a shaft having a longitudinal axis and configured to interface with and hold a roll of wrapping material, said method comprising wrapping the coil with the wrapping material being rolled off the roll in successive wrapping turns each comprising a sequence of robot movements including two handovers of the roll of wrapping material between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:
   a. positioning the robot arm of the respective robots so that the longitudinal axis of the shaft of the robot arm holding the roll of wrapping material is directed in an inclined angular direction relative the direction of rotation of the coil, wherein the longitudinal axis of the shaft of the robot arm holding the roll is positioned and maintained in a substantially constant angular direction within an angle range of 2 to 30 degrees relative the direction of rotation of the coil and the sub-area of the curved envelope surface to which the wrapping material is applied, and
   a. moving the respective robot and robot arm holding the roll of wrapping material along the curved envelope surface so that the direction of travel of the roll and the respective robot arm holding the roll along the curved envelope surface is in a direction at an angle relative an axis along the curved envelope surface which is parallel to the rotational axis of the coil, wherein the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece in form of a shaft having a longitudinal axis and configured to interface with and hold a roll of wrapping material, said method comprising wrapping the coil with the wrapping material being rolled off the roll in successive wrapping turns each comprising a sequence of robot movements including two handovers of the roll of wrapping material between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:
   b. positioning, in three-dimensional space along and outside a first outer circumferential edge of the coil, the robot arm of a first robot holding the roll of wrapping material in a different position in three-dimensional space relative a corresponding position along and outside said first outer circumferential edge for the immediately preceding wrapping turn, and
   c. positioning the robot arm of the respective robots so that the longitudinal axis of the shaft of the robot arm holding the roll of wrapping material is directed in an inclined angular direction relative the direction of rotation of the coil, wherein the longitudinal axis of the shaft of the robot arm holding the roll is positioned and maintained in a substantially constant angular direction within an angle range of 2 to 30 degrees relative the direction of rotation of the coil and the sub-area of the curved envelope surface to which the wrapping material is applied.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising at least one of:

a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and
b. positioning the robot arm of the respective robots so that the longitudinal axis of the roll holder shaft of the robot tool holding the roll is directed in an inclined angular direction relative the direction of rotation of the coil, wherein the longitudinal axis of the roll holder shaft is positioned and maintained in a substantially constant angular direction within an angle range of 2 to 30 degrees relative the direction of rotation of the coil and the sub-area of the curved envelope surface to which the wrapping material is applied, and
c. moving the respective robot and robot arm holding the roll of wrapping material along the curved envelope surface so that the direction of travel of the roll and the respective robot arm holding the robot tool along the curved envelope surface is in a direction at an angle relative an axis along the curved envelope surface which is parallel to the rotational axis of the coil.

In embodiments, the technology disclosed relates to a robot system comprising a robot control system, a cradle for carrying the coil, two industrial robots, each industrial robot being provided with at least one robot arm having a coupling robot piece configured to interface with a robot tool having two ends each configured to interface with a coupling robot piece of a robot arm, and a roll holder shaft projecting substantially perpendicular to an axis extending between said two ends and carrying a roll of wrapping material, wherein said robot control system is configured to control the movements of the robots in relation to the coil in order to wrap the coil with the wrapping material in successive wrapping turns each comprising a sequence of robot movements including two handovers of the robot tool between the two robots per wrapping turn, and wherein said robot control system is further configured to control the movements of the robots and their respective robot arm so that the application of the wrapping material to the surfaces of the coil is comprising at least one of:

a. position, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and
b. positioning the robot arm of the respective robots so that the longitudinal axis of the roll holder shaft of the robot tool holding the roll is directed in an inclined angular direction relative the direction of rotation of the coil, and
c. moving the respective robot and robot arm holding the robot tool along the curved envelope surface so that the direction of travel for the respective robot and robot arm holding the roll along the curved envelope is at an angular direction within the angle range of 0.1 to 15 degrees relative an axis along the curved envelope surface which is parallel to the rotational axis of the coil.

In embodiments, the technology disclosed relates to a robot system comprising a robot control system, a cradle for carrying the coil, two industrial robots, each industrial robot being provided with at least one robot arm having a coupling robot piece configured to interface with a robot tool having two ends each configured to interface with a coupling robot piece of a robot arm, and a roll holder shaft projecting substantially perpendicular to an axis extending between said two ends and carrying a roll of wrapping material, wherein said robot control system is configured to control the movements of the robots in relation to the coil in order to wrap the coil with the wrapping material in successive wrapping turns each comprising a sequence of robot movements including two handovers of the robot tool between the two robots per wrapping turn, and wherein said robot control system is further configured to control the movements of the robots and their respective robot arm so that the application of the wrapping material to the surfaces of the coil is comprising:

a. moving the respective robot and robot arm holding the robot tool along the curved envelope surface so that the direction of travel for the respective robot and robot arm holding the roll along the curved envelope is at an angular direction within the angle range of 0.1 to 15 degrees relative an axis along the curved envelope surface which is parallel to the rotational axis of the coil.

A robot system configured to move the respective robot and robot arm holding the robot tool along the curved envelope surface so that the direction of travel for the respective robot and robot arm holding the roll along the curved envelope is at an angular direction within the angle range of 0.1 to 15 degrees relative an axis along the curved envelope surface which is parallel to the rotational axis of the coil reduces the risk of creases being formed in the film applied to the curved envelope surface of the coil, providing for improved productivity and ensuring the sealed integrity of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising:
  a. positioning the robot arm of the respective robots so that the longitudinal axis of the roll holder shaft of the robot tool holding the roll is directed in an inclined angular direction relative the direction of rotation of the coil, wherein the longitudinal axis of the roll holder shaft is positioned and maintained in a substantially constant angular direction within an angle range of 2 to 20 degrees relative the direction of rotation of the coil and the sub-area of the curved envelope surface to which the wrapping material is applied, and
  b. moving the respective robot and robot arm holding the roll of wrapping material along the curved envelope surface so that the direction of travel of the roll and the respective robot arm holding the robot tool along the curved envelope surface is in a direction at an angle relative an axis along the curved envelope surface which is parallel to the rotational axis of the coil, wherein the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material is comprising the actions of:
  a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and
  b. positioning the robot arm of the respective robots so that the longitudinal axis of the roll holder shaft of the robot tool holding the roll is directed in an inclined angular direction relative the direction of rotation of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material is comprising at least one of the actions of:
  a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn,
  b. positioning the robot arm of the respective robots so that the longitudinal axis of the roll holder shaft of the robot tool holding the roll is directed in an inclined angular direction relative the direction of rotation of the coil, and
  c. moving the respective robot and robot arm holding the robot tool along the curved envelope surface so that the direction of travel of the robot tool and the respective robot arm holding the robot tool along the curved envelope surface is in a direction at an angle relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material is comprising at least one of the actions of:
  a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn,
  b. positioning the robot arm of the respective robots so that the longitudinal axis of the roll holder shaft of the robot tool holding the roll is directed in an inclined angular direction relative the direction of rotation of the coil, wherein the longitudinal axis of the roll holder shaft holding the roll is positioned and maintained in a substantially constant angular direction within an angle range of 2 to 30 degrees relative the direction of rotation of the coil and the sub-area of the curved envelope surface to which the wrapping material is applied, and c. moving the respective robot and robot arm holding the robot tool along the curved envelope surface so that the direction of travel of the robot tool and the respective robot arm holding the robot tool along the curved envelope surface is in a direction at an angle relative an axis along the curved envelope surface which is parallel to the rotational axis of the coil, wherein the direction of travel for the respective robot and robot arm holding the roll holder shaft along the curved envelope is in a straight direction at an angular direction within the angle range of 0.1 to 15 degrees relative an axis along the curved envelope surface which is parallel to the rotational axis of the coil.

In embodiments, the technology disclosed relates to a system and method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material is comprising the actions of:

a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, b. positioning the robot arm of the respective robots so that the longitudinal axis of the roll holder shaft of the robot tool holding the roll is directed in an inclined angular direction relative the direction of rotation of the coil, wherein the longitudinal axis of the roll holder shaft holding the roll is positioned and maintained in a substantially constant angular direction within an angle range of 2 to 30 degrees relative the direction of rotation of the coil and the sub-area of the curved envelope surface to which the wrapping material is applied, and c. moving the respective robot and robot arm holding the robot tool along the curved envelope surface so that the direction of travel of the robot tool and the respective robot arm holding the robot tool along the curved envelope surface is in a direction at an angle relative an axis along the curved envelope surface which is parallel to the rotational axis of the coil, wherein the direction of travel for the respective robot and robot arm holding the roll holder shaft along the curved envelope is in a straight direction at an angular direction within the angle range of 0.1 to 15 degrees relative an axis along the curved envelope surface which is parallel to the rotational axis of the coil.

In different embodiments, the method of the technology disclosed is comprising the positioning of the robot arm of the respective and the roll in a different position in three-dimensional space relative a corresponding position along and outside said first outer circumferential edge for the immediately preceding wrapping turn to thereby reduce the risk of creases being formed in the film applied to the curved envelope surface of the coil, providing for improved productivity and ensuring the sealed integrity of the coil.

In different embodiments, the method of the technology disclosed is comprising the positioning of the robot arm of the respective robots so that the longitudinal axis of the roll holder shaft of the robot tool holding the roll is directed in an inclined angular direction relative the direction of rotation of the coil along the curved envelope surface to thereby reduce the risk of creases being formed in the film applied to the curved envelope surface of the coil, providing for improved productivity and ensuring the sealed integrity of the coil.

In different embodiments, the method of the technology disclosed is comprising the moving of the respective robot and robot arm holding the robot tool along the curved envelope surface so that the direction of travel of the robot tool and the respective robot arm holding the robot tool along the curved envelope surface is in a direction at an angle relative an axis along the curved envelope surface which is parallel to the rotational axis of the coil to thereby reduce the risk of creases being formed in the film applied to the curved envelope surface of the coil, providing for improved productivity and ensuring the sealed integrity of the coil.

In embodiments, the technology disclosed relates to a robot system comprising a robot control system, a cradle for carrying the coil, two industrial robots, each industrial robot being provided with at least one robot arm having a coupling robot piece configured to interface with and hold a roll of wrapping material, wherein said robot control system is configured to control the movements of the robots in relation to the coil in order to wrap the coil with the wrapping material in successive wrapping turns each comprising a sequence of robot movements including two handovers of the roll between the two robots per wrapping turn, and wherein said robot control system is further configured to control the movements of the robots and their respective robot arm so that the application of the wrapping material to the surfaces of the coil is comprising at least one of:

a. positioning, in three-dimensional space along and outside a first outer circumferential edge of the coil, the robot arm of a first robot holding the roll of wrapping material in a different position in three-dimensional space relative a corresponding position along and outside said first outer circumferential edge for the immediately preceding wrapping turn, b. positioning the robot arm of the respective robots so that the longitudinal axis of the shaft of the robot arm holding the roll is directed in an inclined angular direction relative the direction of rotation of the coil, wherein the longitudinal axis of the shaft of the robot arm is positioned and maintained in a substantially constant angular direction within an angle range of 2 to 30 degrees relative the direction of rotation of the coil and the sub-area of the curved envelope surface to which the wrapping material is applied, and c. moving the respective robot and robot arm holding the robot tool along the curved envelope surface so that the direction of travel of the roll and the respective robot arm holding the roll along the curved envelope surface is in a direction at an angle relative an axis along the curved envelope surface which is parallel to the rotational axis of the coil, wherein the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

In different embodiments, the robot system and robot control system is configured to position the robot arm of the respective and the roll in a different position in three-dimensional space relative a corresponding position along and outside said first outer circumferential edge for the immediately preceding wrapping turn to thereby reduce the risk of creases being formed in the film applied to the curved envelope surface of the coil, providing for improved productivity and ensuring the sealed integrity of the coil.

In different embodiments, the robot system and robot control system is configured to position the robot arm of the respective robots so that the longitudinal axis of the shaft of the robot arm holding the roll is directed in an inclined angular direction relative the direction of rotation of the coil along the curved envelope surface to thereby reduce the risk of creases being formed in the film applied to the curved envelope surface of the coil, providing for improved productivity and ensuring the sealed integrity of the coil.

In different embodiments, the robot system and robot control system is configured to move the respective robot and robot arm holding the roll with wrapping material along the curved envelope surface so that the direction of travel of the roll of wrapping material and the respective robot arm holding the roll along the curved envelope surface is in a direction at an angle relative an axis along the curved envelope surface which is parallel to the rotational axis of the coil, thereby reducing the risk of creases being formed in the film applied to the curved envelope surface of the coil and providing for improved productivity and ensuring the sealed integrity of the coil.

In embodiments, the technology disclosed relates to a robot system comprising a robot control system, a cradle for carrying the coil, two industrial robots, each industrial robot being provided with at least one robot arm having a coupling robot piece configured to interface with a robot tool having two ends each configured to interface with a coupling robot piece of a robot arm, and a roll holder shaft projecting substantially perpendicular to an axis extending between said two ends and carrying a roll of wrapping material, wherein said robot control system is configured to control the movements of the robots in relation to the coil in order to wrap the coil with the wrapping material in successive wrapping turns each comprising a sequence of robot movements including two handovers of the robot tool between the two robots per wrapping turn, and wherein said robot control system is further configured to control the movements of the robots and their respective robot arm so that the application of the wrapping material to the surfaces of the coil is comprising at least one of:

a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, b. positioning the robot arm of the respective robots so that the longitudinal axis of the roll holder shaft of the robot tool holding the roll is directed in an inclined angular direction relative the direction of rotation of the coil, wherein the longitudinal axis of the roll holder shaft holding the roll is positioned and maintained in a substantially constant angular direction within an angle range of 2 to 30 degrees relative the direction of rotation of the coil and the sub-area of the curved envelope surface to which the wrapping material is applied, and c. moving the respective robot and robot arm holding the robot tool along the curved envelope surface so that the direction of travel of the robot tool and the respective robot arm holding the robot tool along the curved envelope surface is in a direction at an angle relative an axis along the curved envelope surface which is parallel to the rotational axis of the coil, wherein the direction of travel for the respective robot and robot arm holding the roll holder shaft along the curved envelope is in a straight direction at an angular direction within the angle range of 0.1 to 15 degrees relative an axis along the curved envelope surface which is parallel to the rotational axis of the coil.

In different embodiments, the robot system and robot control system is configured to position the robot arm of the respective and the roll in a different position in three-dimensional space relative a corresponding position along and outside said first outer circumferential edge for the immediately preceding wrapping turn to thereby reduce the risk of creases being formed in the film applied to the curved envelope surface of the coil, providing for improved productivity and ensuring the sealed integrity of the coil.

In different embodiments, the robot system and robot control system is configured to position the robot arm of the respective robots so that the longitudinal axis of the roll holder shaft of the robot tool holding the roll is directed in an inclined angular direction relative the direction of rotation of the coil along the curved envelope surface to thereby reduce the risk of creases being formed in the film applied to the curved envelope surface of the coil, providing for improved productivity and ensuring the sealed integrity of the coil.

In different embodiments, the robot system and robot control system is configured to move the respective robot and robot arm holding the robot tool along the curved envelope surface so that the direction of travel of the robot tool and the respective robot arm holding the robot tool along the curved envelope surface is in a direction at an angle relative an axis along the curved envelope surface which is parallel to the rotational axis of the coil to thereby reduce the risk of creases being formed in the film applied to the curved envelope surface of the coil, providing for improved productivity and ensuring the sealed integrity of the coil.

In embodiments, the technology disclosed relates to methods, a computer program product and a robot system for wrapping the surfaces of a coil in successive wrapping turns by positioning the robot arm of a robot so that the position, in three-dimensional space along a first outer circumferential edge between a first end surface and the curved envelope surface of the coil, for where the robot tool begins to move along the curved envelope surface of the coil is a different position relative the corresponding position for the immediately preceding wrapping turn. By adjusting the position between successive wrapping turns/passes and by taking into account the outer and inner radius of the coil and the rotational speed of the coil, e.g. a substantially constant rotational speed, a certain width of the overlap between the wrapping passes may be defined.

In embodiments, the technology disclosed relates to methods, a computer program product and a robot system for wrapping the entire surface of a coil in successive wrapping turns/passes/laps by positioning the robot arm of a robot so that the position, in three-dimensional space along the outer circumferential edge between the end surface and the curved envelope surface of the coil, for where the wrapping of the curved envelope surface of the coil starts for a certain wrapping turn/pass/lap is a different position relative a corresponding position for the immediately preceding wrapping turn/pass/lap, thereby providing an overlap between the successive passes on the curved envelope surface.

In embodiments, the technology disclosed relates to a computer program product and a robot control system for controlling the positioning of a robot arm holding a robot tool carrying a roll of wrapping material in at least ten successive wrapping turns/passes/laps so that the (starting) position for each wrapping turn/pass/lap, in three-dimensional space along a first outer circumferential edge between a first end surface and the curved envelope surface of a coil, is a different position relative the (starting) position for the immediately preceding wrapping turn/pass, thereby defining an overlap between the successive turns/passes/laps.

In embodiments, the technology disclosed relates to methods, a computer program product and a robot system for positioning the robot arm of a first robot so that the position of the robot arm holding the roll and thereby the roll along a first outer circumferential edge between a first end surface of the coil and the curved envelope surface of the coil is continuously adjusted during operation to be mutually different for each of at least ten consecutive wrapping turns/passes for applying the wrapping material to the curved envelope surface. The movement operations of the robot and robot arm may then be controlled in accordance with control data received by the robot from the robot control system and/or stored software instructions of a computer program product executed by the robot and/or robot control system so that the position of the robot and robot arm along a first circumferential edge of the coil is continuously adjusted during consecutive wrapping turns/passes.

In certain embodiments, the position, in three-dimensional space, for the robot arm holding the roll along the first outer circumferential edge is adapted to the rotational speed of the coil and travel distance of the outer radius of the coil during each turn/pass/wrap/revolution so that each successive wrapping turn/pass defines a substantially a certain width of the overlapping strips of wrapping material, e.g. a substantially constant width of the overlap, produced on the curved envelope surface between successive turns/passes/wraps/revolutions of the wrapping material.

The movement operations of the robot and robot arm may then be adapted to the rotational speed of the coil and controlled in accordance with control data received by the robot from the robot control system and/or stored software instructions of a computer program product executed by the robot and/or robot control system so that the positioning and movement operations of the robot and robot arm defines a certain overlap between successive wrapping passes along the curved envelope surface, e.g. a substantially constant width of the overlap between successive wrapping turns/passes. The sequence of movements and travel paths of the robot and robot arm which defines and produces a certain width of the overlap between successive wrapping turns/passes may then typically be controlled by stored software code and instructions executed by the robot control system. The sequence of movements and travel paths are the typically defined by the stored software code of computer program product of the robot control system by taking into account the outer radius and rotational speed of the coil, e.g. a substantially constant rotational speed of the coil.

In certain embodiments, the travel paths in three-dimensional space for the respective robot and robot arm, for each successive wrapping pass along the curved envelope surface, are controlled by the robot control system so that the direction of travel along the curved envelope for the respective robot and robot arm holding the roll or robot tool is in a direction at an angular direction within the angle range of 0.1 to 15 degrees relative an axis along the curved envelope surface which is parallel to the rotational axis of the coil. The travel paths for the robot and robot arm for each wrapping pass along the curved envelope surface may then typically be defined and controlled by software code and instructions of a computer program product of the robot control system.

In certain embodiments, the travel paths in three-dimensional space for the robot and robot arm, for each wrapping pass along the curved envelope surface, are controlled by the robot control system so that the direction of travel is maintained in a substantially constant direction within the angle range of 0.1 to 15 degrees relative an axis along the curved envelope surface which is parallel to the rotational axis of the coil.

In embodiments, the travel paths for the robot and robot arm includes positioning the respective robot arm holding the robot tool with the roll of wrapping material so that the longitudinal axis of the roll holder shaft holding the roll is maintained, during movement of the respective robot arm along the curved envelope surface, at a substantially constant inclined angle relative the direction of rotation of the coil and the direction of rotation of the sub-area of the curved envelope surface to which the wrapping material is applied.

In embodiments, the technology disclosed relates to methods, a computer program product and a robot system for positioning, by the respective robot and robot arm holding the robot tool along the curved envelope surface of the coil, the longitudinal axis of the roll holder shaft of the robot arm or robot tool holding the roll at an inclined angular direction relative the direction of rotation of the coil.

The movement operations of the robot and robot arm may then be controlled in accordance with control data received by the robot from the robot control system and/or stored software instructions of a computer program product executed by the robot and/or robot control system so that the angular direction of the longitudinal axis of the roll holder shaft of the robot arm or robot tool holding the roll is maintained, at least during movement of the roll along the curved envelope surface including during the handover phase between the two robots along the curved envelope surface, at a substantially constant inclined angular direction relative the direction of rotation of the coil. The sequence of movements of the robot and robot arm may then typically be controlled by stored software code and instructions (control data) executed by the robot control system taking into account the rotational speed and outer radius of the coil.

In embodiments, the longitudinal axis of the roll holder shaft of the robot arm or robot tool holding the roll may be positioned and maintained in an angular direction within an angle range of 2 to 30 degrees relative the direction of rotation of the coil and the sub-area of the curved envelope surface to which the wrapping material is applied. In certain embodiments, the longitudinal axis of the roll holder shaft may be positioned and maintained, by the respective robot and robot arm, in a substantially constant angular direction within an angle range of 2 to 30 degrees relative the direction of rotation of the coil, at least during movement of the respective robot and/or robot tool along the curved envelope surface.

In other embodiments, the longitudinal axis of the roll holder shaft may be positioned and maintained in a variable angular direction along the curved envelope surface but still be within an angle range of 2 to 30 degrees relative the direction of rotation of the coil, at least during the entire movement of the respective robot and robot arm holding the roll along the curved envelope surface including during the handover phase between the two robots along the curved envelope surface of the coil.

The longitudinal axis of the roll holder shaft may then be positioned and maintained, by the respective robot/robot arm holding the robot tool, to be directed at a substantially constant angular direction relative the direction of rotation of the coil (and the direction of rotation of the sub-area of the curved envelope surface where the wrapping material is applied) and during the sequence of movements of the respective robot and robot arm for applying the wrapping material of a rotating roll to the sub-area of the curved envelope surface.

In embodiments, the longitudinal axis of the roll holder shaft is positioned, by the respective robot and robot arm holding the robot tool before, during and after the handover phase along the curved envelope surface and under the control of the robot control system, in a substantially constant angular direction within an angle range of 2 to 30 degrees relative the direction of rotation of the coil and the sub-area of the curved envelope surface to which the wrapping material is applied.

In certain embodiments, the technology disclosed further relates to a robot tool for coil packaging, comprising two ends, each end being configured to interface with a robot arm, e.g. each end of the robot tool is provided with a coupling tool piece configured to interface with a robot arm.

In certain embodiments, the robot tool comprises a roll holder shaft configured to hold a roll of wrapping material, the holder shaft at one end being mounted between said ends and projecting substantially perpendicular to an axis extending between said ends.

In certain embodiments, the technology disclosed relates to a method and system for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the respective robot arm, and a roll holder shaft projecting substantially perpendicular to an axis extending between said two ends and carrying a roll of wrapping material.

In embodiments, the technology disclosed relates to a method for wrapping a coil in a robot system comprising a robot control system, a cradle for carrying the coil, two robots, each industrial robot being provided with at least one robot arm having a coupling robot piece configured to interface with a robot tool having two ends each configured to interface with a coupling robot piece of a robot arm, and a roll holder shaft projecting substantially perpendicular to an axis extending between said two ends and carrying a roll of wrapping material.

In embodiments, the travel paths for the robot and robot arm includes positioning the robot arm holding the robot tool with the roll of wrapping material so that the entry position, in three-dimensional space along/outside the edge between a first end surface and the curved envelope surface of the coil, for the wrapping of the curved envelope surface for a certain wrapping pass is a different position relative the position for the immediately preceding wrapping turn/pass. The adjustments of the entry position in three-dimensional space for where the wrapping of the curved envelope surface may be determined based on the dimensions, e.g. the outer radius, of the coil and the rotational speed of the coil to thereby define a certain overlap between successive wrapping turns/passes.

In embodiments, the technology disclosed relates to a method of wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn/pass, wherein a first handover phase takes place in a hollow cylindrical center core of the coil and a second handover phase takes place along the curved envelope surface of the coil, and wherein the application of the wrapping material to the surfaces of the coil is comprising positioning the robot arm holding the robot tool with the roll of wrapping material so that the position, in three-dimensional space along the edge between a first end surface and the curved envelope surface of the coil, at which the wrapping of the curved envelope surface is initiated for a specific wrapping turn/pass is a different position relative the position for the immediately preceding wrapping turn/pass.

In embodiments, the technology disclosed relates to a method of wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn/pass, wherein a first handover phase takes place in a hollow cylindrical center core of the coil and a second handover phase takes place along the curved envelope surface of the coil, and wherein the application of the wrapping material to the surfaces of the coil is comprising positioning, at least during movement of the respective robot along the curved envelope surface of the coil, the robot arm of the respective robot so that the longitudinal axis of the roll holder shaft of the robot tool holding the roll is maintained at a substantially constant inclined angle relative the direction of rotation of the coil and the direction of rotation of the sub-area of the curved envelope surface to which the wrapping material is applied.

In embodiments, the method comprises wrapping the coil with the wrapping material in a sequence of robot movements including two handovers of the robot tool between the two robots per lap, or wrapping revolution/pass, wherein a first handover phase takes place in a hollow cylindrical center core of the coil and a second handover phase takes place along the curved envelope surface of the coil. In certain embodiments In embodiments, at least one of the first and second handover of the robot tool between the two robots and their respective robot arms is performed while both two robot arms handing over the robot tool between them are in motion while simultaneously holding the robot tool. In example embodiments, the two robot arms are both moving during the handover taking place in the hollow cylindrical center core of the coil and/or the two robot arms are both moving during the second handover that takes place along the curved envelope surface of the coil.

In certain embodiments, and in order to achieve this handover "on-the-fly", the actuating power, e.g. pneumatic power or hydraulic power, of the robot arm of the robot handing over the robot tool to the other robot arm is reduce or turned off at a certain distance within a distance interval of 20-200 mm from the position/area, in three-dimensional space, of the handover phase when both of the two robot arms for the first time are simultaneously holding the robot tool.

In the example embodiment when the robot tool is completely turned off at a certain distance from the handover position/area, the robot tool is typically held by and locked to the coupling robot piece of the robot arm handing over the robot tool solely by mechanical force just before and during the initial phase of the handover when the robot tool is held by both robot arms, e.g. solely by mechanical spring tension. In the example embodiment when the robot tool is reduced at a certain distance from the handover position/area, the robot tool is typically held by and locked to the coupling robot piece of the robot arm handing over the robot tool partly by pneumatic power or hydraulic power and partly by mechanical force just before and during the initial phase of the handover when the robot tool is held by both robot arms. An inductive sensor on at least one of the two robot arms, or the robot tool, may be used for determining that it is time to reduce or turn off the actuating power, or the software program and control data of the robot control system may determine the time instant for reducing or shutting off the actuating power of the robot arm handing over the robot tool. These handover "on-the-fly" procedures which include reducing or shutting off the actuating power at a certain distance from the handover position/area provides for a faster handover and improved productivity because there is no need for any of the two robot arms to stand still during the handover and lose time.

In certain aspects, the technology disclosed relates to a method for wrapping a coil in a robot system comprising a robot control system, a cradle for carrying the coil, two industrial robots, each industrial robot being provided with at least one robot arm having a coupling robot piece configured to interface with a robot tool having two ends each configured to interface with the coupling robot piece of the at least one robot arm, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along the curved envelope surface of the coil, and wherein the application of the wrapping material to the surfaces of the coil is comprising:

a. reducing or turning off the actuating power, e.g. pneumatic power or hydraulic power, of the robot arm of the robot handing over the robot tool to the other robot arm at a certain distance within a distance interval of 20-200 mm from the handover position.

In certain aspects, the technology disclosed relates to a robot system comprising a robot control system, a cradle for carrying the coil, two industrial robots, each industrial robot being provided with at least one robot arm having a coupling robot piece configured to interface with a robot tool having two ends each configured to interface with a coupling robot piece of a robot arm, and a roll holder shaft projecting substantially perpendicular to an axis extending between said two ends and carrying a roll of wrapping material, wherein said robot control system is configured to control the movements of the robots in relation to the coil in order to wrap the coil with the wrapping material in successive wrapping turns each comprising a sequence of robot movements including two handovers of the robot tool between the two robots per wrapping turn, and wherein said robot control system is further configured to control the movements of the robots and their respective robot arm so that the application of the wrapping material to the surfaces of the coil is comprising:

a. reducing or turning off the actuating power, e.g. pneumatic power or hydraulic power, of the robot arm of the robot handing over the robot tool to the other robot arm at a certain distance within a distance interval of 20-200 mm from the handover position.

BRIEF DESCRIPTION OF DRAWINGS

Embodiments disclosed herein will be further explained with reference to the accompanying drawings, in which.

DESCRIPTION OF EMBODIMENTS

Figure 1A:
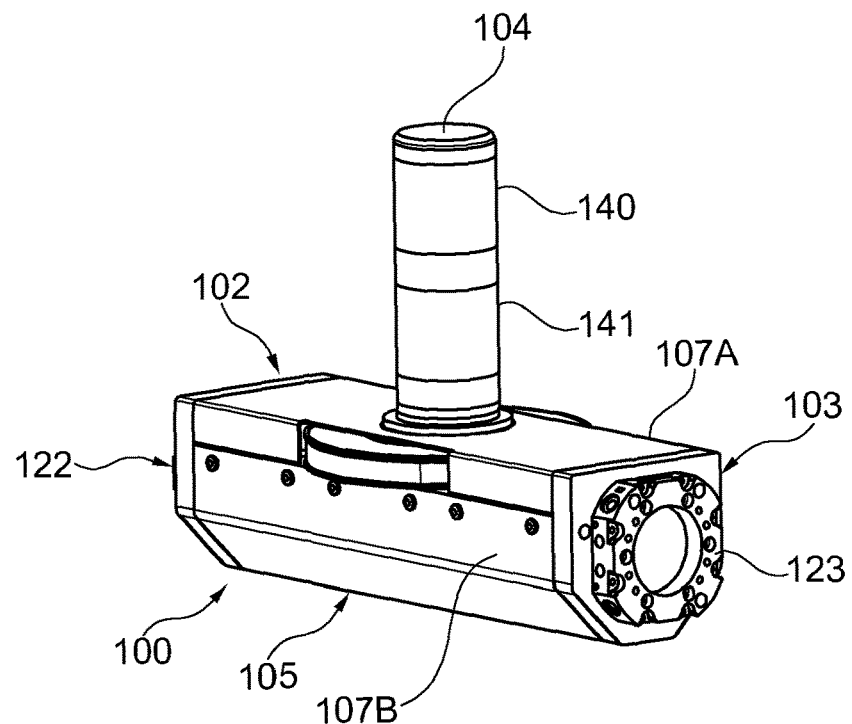
FIG. 1A illustrates schematically an embodiment of a robot tool provided with a roll holder shaft for holding a roll of wrapping material and being configured for handover between robot arms of coordinated robots.

This disclosure describes a system and apparatus for wrapping exposed surfaces of a large annular coil, including its hollow cylindrical core, to thereby prevent contamination and/or prepare the coil for shipping.

The system and apparatus comprise a pair of robots handing off/over, or transferring, a robot tool comprising a roll of wrapping material, such as a plastic stretch film, from a coupling robot piece, for example a gripper, on one robot arm of a first robot to a coupling robot piece on the robot arm of the other robot.

The robot system may comprise a robot control system, two industrial robots, each robot being provided with a robot arm having a coupling robot piece which may be configured to interface with a roll or a robot tool.

In the example embodiment when the coupling robot piece of the robot arm interfaces directly with the roll, the method comprises wrapping the coil in a sequence of robot movements with handover of the roll of wrapping material from a first industrial robot to a second industrial robot and vice versa.

In the example embodiment when the robot arm interfaces with a robot tool, the robot tool may have two ends, each end being provided with a coupling tool piece configured to interface with a robot arm, and a roll holder shaft configured to hold a roll of packaging material, the roll holder shaft at one end being mounted between said ends and projecting substantially perpendicular to an axis extending between said ends. The method of the technology disclosed may then comprise wrapping the coil in a sequence of robot movements with handover of the robot tool with the roll of wrapping material from a first industrial robot to a second industrial robot and vice versa.

Critical to the success of the wrapping process is that the extended strip of wrapping material removed from the roll is maintained at and/or under a certain level of tension which may or may not be selected by the operator. The coupling robot piece of the robot arm may be controlled by actuating power, e.g. pneumatic power, and actuated by a Central Processing Unit (CPU) of the robot control system to close the coupling robot piece of the robot, for example a gripper or a master piece, configured to be able to grip or mate with a roll or at least one end of a robot tool.

The sequence of movements of the robot arm holding the robot tool carrying the roll of wrapping material are adapted to thereby allow the wrapping material to unravel smoothly at a controlled dispensing rate. A uniform tension may be imposed on the strip as the two robot arms pull roll back and forth around the coil. If the roll were allowed to "freewheel" without any tension, the strip would flap about, crinkle, and end up being applied randomly to coil. Random application of the strip is not conducive to effective stretch wrapping of coil.

Since coil is typically being rotated slowly by rollers of the coil roller, each time the wrap cycle shown has been completed, a strip of wrapping material is applied to a segment of the annulus, i.e. a segment of the different surfaces of the coil. The width of the segment along the curved envelope surface is preferably well-defined by the movements and travel paths, in three-dimensional space, of the two robots and robot arms which are typically controlled by the robot control system and are different for each wrapping turn/pass/cycle/revolution around the annulus/coil. The width of the wrapping material on roll is typically reduced by the tension.

In at least some of the embodiments of the technology disclosed, the path of the strip around annulus is not strictly radial, however; rather, because the slow rotation of coil is not fully compensated for by method proposed herein, including positioning the rotation axis of the roll, or roll holder shaft, so that the rotation axis is directed at an inclined angular direction relative the direction of rotation of the coil or by a direction of travel along the curved envelope surface which is in an angular direction related to the rotation axis of the coil, the path traverses coil at a slight angle.

The result is, that as the wrapping pass is repeated time and again with a slightly different travel path for the two robot arm in three-dimensional space for consecutive wrapping passes, the annulus is typically wrapped in a helical fashion until the entire outer surface of coil has been sealed, i.e., such that no surface area of coil is left exposed. To securely cover the entire surface of coil, an overlap of adjacent strips of wrapping material is necessary. The resulting amount of material overlap is at least determined by the positioning and travel paths of the robotic arms, the speed of the robot arms, and the outer radius and rotational speed of coil.

In embodiments, the sequence of movements of the robot arm is controlled by a software program of the robot control system. Control data may then be transmitted from the robot control system to the robot to control the movements of the robot and the robot arm of the robot. In certain embodiments, the robot control system comprises pre-stored software program associated with a certain coil for controlling the sequence of movements for wrapping the individual coil with a wrapping material. In other embodiments, certain dimensions of the individual coil, e.g. the inner and/or outer radius of the coil, are first measured and the software program and/or the control data for the controlling the travel paths, speed and sequence of movements of the two robots and their respective robot arm(s) is selected or generated based on the measured dimensions of the coil.

According to embodiments of the technology disclosed, the travel path of the robotic arms traveling around the coil may be adjusted and adapted to the rotational travel distance for the application position on the envelope surface during a pass and the rotational speed of the coil, e.g. a constant rotational speed, used for wrapping each individual coil and to the relative height and width of each individual coil to thereby minimize wrap time and reduce wear and tear.

In embodiments, the position for the robot tool holding the roll is adjusted before applying the wrapping material on the curved envelope surface. The position adjustment is then performed for each lap or wrapping sequence so that the vertical position of the tool along the curved envelope surface perpendicular to the rotational axis of the coil. The position adjustment is then performed for each lap by the robot arm currently holding the roll and before starting the sequence of robot movements for wrapping the curved envelope surface. In embodiments, the position adjustment is adapted to the rotational speed of the coil, e.g. adapted to a constant rotational speed of the coil. A corresponding position adjustment in the opposite direction is typically performed for each lap by the other robot arm after wrapping the curved envelope surface with the wrapping material but before the next handover of the robot tool between the robots inside the coil.

In certain embodiments, the technology disclosed proposes the combination of adjusting the position of the robot tool holding the roll and that the direction of travel for the robot tool holding the roll is at an angle relative a direction parallel to the rotational axis of the coil. The combination of position adjustment and angle for the direction of travel along the curved envelope surface may then be selected to be adapted to the rotational speed of the coil and may or may not be slightly different for each lap. In certain embodiments, the vertical position adjustment (perpendicular to the rotational axis of the coil) and overlap along the curved envelope surface may be at least 75% of the width of the roll, e.g. between 75 and 95% of the width of the roll, and the direction of travel along the curved envelope surface is selected to be at an angle, e.g. constant angular direction, between 0.1-15 degrees relative a direction parallel to the rotational axis of the coil. The position adjustments performed before and after applying the wrapping material on the envelope surface and inclined direction of travel are carried out in order to achieve a more constant tension of the wrapping material and keep the wrapping material, e.g. stretch film, taut while being pulled along the curved envelope surface, thereby reducing the risk of creases being formed in the film applied on the curved envelope surface of the coil.

In embodiments, the roll holder shaft holding the roll is directed at an angle relative the direction of rotation of the coil during travel along the curved envelope surface. The shaft may then be tilted, by the robot arm currently holding the roll, relative the direction of rotation of the coil along the envelope surface. The tilting of the shaft is performed for each lap and before starting the sequence of robot movements for wrapping the curved envelope surface. The tilt angle may be adapted to the rotational speed of the coil, e.g. be adapted to a constant rotational speed of the coil.

In embodiments, the holder shaft may be tilted back after wrapping the curved envelope surface and before the robot tool reaches the position for the next handover of the robot tool inside the coil. During travel inside the coil, the shaft of the robot tool is tilted back by the robot holding the tool so that the roll holder shaft is directed substantially perpendicular to the axis of rotation of the coil.

In certain embodiments of the technology disclosed, the tilt angle relative the direction of rotation of the coil is selected to be at an angle between 2-30 degrees along the curved envelope surface. The tilting angle relative the direction of rotation of the coil may then be adapted to the rotational speed of the coil, e.g. a constant rotational speed, and is carried out in order to achieve a more constant tension of the wrapping material and keep the wrapping material, e.g. stretch film, taut while being pulled along the curved envelope surface, thereby reducing the risk of creases being formed in the film applied on the curved envelope surface of the coil.

In embodiments, the method of the technology disclosed comprises:
   wrapping the curved envelope surface of the coil by holding, by the respective first and second industrial robot, the longitudinal axis of the roll holder shaft at an angle which is inclined with respect to the direction of rotation of the coil along the curved envelope surface area.

In embodiments, the technology disclosed proposes a solution including a combination of position adjustment for the robot tool holding the roll before starting unfolding the wrapping material on the curved envelope surface and that the roll holder shaft is tilted relative the direction of rotation of the coil during travel along the curved envelope surface. In embodiments, the position adjustments and the tilt angle may be adapted to the rotational speed of the coil, e.g. adapted to a constant rotational speed of the coil. The combination of position and tilt adjustments is performed to achieve a more constant tension of the wrapping material and keep the wrapping material, e.g. stretch film, taut while being pulled along the curved envelope surface, thereby reducing the risk of creases being formed in the film applied on the curved envelope surface of the coil.

In certain embodiments of the technology disclosed, the direction of travel along the curved envelope surface is selected to be at a certain angle between 0.1-10 degrees relative to an axis direction parallel to the rotational axis and the tilt (during travel along the curved envelope surface) is selected to be at a certain angle between 2-15 degrees angle relative the direction of rotation of the coil. The tilt angle relative the direction of rotation of the coil may then be adapted to the rotational speed of the coil, e.g. a constant rotational speed, and is carried out in order to achieve a more constant tension of the wrapping material and keep the wrapping material, e.g. stretch film, taut while being pulled along the curved envelope surface, thereby reducing the risk of creases being formed in the film applied on the curved envelope surface of the coil.

In embodiments and by adapting the travel path to the rotational speed of the coil and by adapting at least one of the tilting angle of the roll holder shaft relative the direction of rotation of the coil along the envelope surface and the vertical position of the roll before beginning the wrapping of the curved envelope surface, a relatively constant tension on the wrapping material may be achieved to keep the wrapping material, e.g. stretch film, taut while being pulled along the curved envelope surface, thereby reducing the risk of creases being formed in the film applied on the curved envelope surface of the coil.

According to example embodiments of the technology disclosed, the robot arms travel around their respective ends of the coil, handing off/over the robot tool with the roll in the center of the hollow core of the coil and along the curved envelope surface of the coil, as the coil is slowly rotated by a coil roller of the cradle carrying the coil. In embodiments, the rotational speed of the coil roller(s) is substantially constant and adapted to the entry position on the curved envelope surface for the robot arm holding the roll such that the wrap overlaps with a certain overlap during each successive pass around the coil, thereby ensuring the sealed integrity of the coil.

A first handover phase takes place in a hollow cylindrical center core of the coil in a direction of travel for the respective robot holding the robot tool before and after the first handover in a same first plane which is substantially parallel to the rotational axis of the coil. A second handover phase takes place along an envelope surface of the coil in a second plane which is a different plane from the first plane.

The first and second industrial robot may both be configured to receive instructions from the robot control system which cause the robot arm of the respective robot to move in the same horizontal plane during the first handover phase taking place in the hollow cylindrical center core of the coil.

In embodiments, the first and second industrial robot are both configured to receive instructions from the robot control system which cause the robot arm of the respective robot to hold the robot tool so that the roller holder shaft of the robot tool is directed substantially parallel to the rotational axis of the coil and substantially perpendicular to the gravitational axis along the path of travel for the two robot arms inside the hollow cylindrical center core of the coil.

The horizontal plane of the second handover phase may be at a different height position from the first horizontal plane of the first handover phase along the axis perpendicular to the rotational axis of the coil.

The travel path and height position along the gravitational axis perpendicular to the rotational axis of the coil may be adjusted, by the robot control system and through computer program instructions, between successive wrapping turns/passes by the respective robot along the respective coil end surface, thereby reducing the risk of creases in the stretch film applied on the envelope surface of the coil.

The technology disclosed may also relate to a robot tool for coil packaging, comprising
- two ends, each end being provided with a coupling tool piece configured to interface with a robot arm;
- a roll holder shaft configured to hold a roll of wrapping material, the holder shaft at one end being mounted substantially midway between said ends and projecting substantially perpendicular to an axis extending between said ends.

The robot tool may then comprise a carrier piece where the coupling tool pieces are each mounted at the respective ends of said carrier piece. The coupling tool pieces may be configured to be able to convey actuating power from a power supply line of a robot.

The robot tool may comprise a coupling in the form of a robot tool changer with the coupling tool piece configured to be able to mate with a coupling master piece of said tool changer mounted on a robot arm. The roll holder shaft of the robot tool may further comprise a roll fixture configured to releasably fix a roll of wrapping material to the roll holder shaft.

A portion of the roll holder shaft may be configured to be radially expandable to enable a roll fixture to releasably fix a roll of wrapping material to the roll holder shaft. The robot tool may further comprise at least one motor configured to drive, prevent and/or brake rotation of the roll holder shaft.

The technology disclosed may also relate to a robot tool for coil wrapping, comprising
- a carrier piece having two opposing ends, each end being provided with a tool piece of a robot tool changer configured to interface by mating with a corresponding master piece of a tool changer of a robot arm;
- a roll holder shaft configured to hold a roll of wrapping material, the holder shaft at one end being mounted on said carrier piece substantially midway between said opposing ends and projecting substantially perpendicular to an axis extending between said opposing ends;

wherein:
- the tool changers are configured to be able to convey actuating pneumatic power from a pneumatic power supply line of a robot when mated;
- wherein a portion of the roll holder shaft is configured to be radially expandable by said pneumatic power to enable a roll fixture to releasably fix a roll of wrapping material to said roll holder shaft;
- at least one pneumatic motor is mounted on the carrier piece, coupled to said roll holder shaft and configured to drive, prevent and/or brake rotation of said roll holder shaft by said pneumatic power.

The technology disclosed may relate to a robot system for coil packaging, comprising:
- two industrial robots, each robot being provided with a robot arm having a coupling robot piece configured to interface with a robot tool;
- a robot tool, the robot tool having two ends, each end being provided with a coupling tool piece configured to interface with a said robot arm, and a roll holder shaft configured to hold a roll of packaging material, the roll holder shaft at one end being mounted substantially midway between said ends and projecting substantially perpendicular to an axis extending between said ends.

The robot system further comprises a robot control system configured to control the movement of the robots in relation to a coil positioned on a coil roller for being packaged with a wrapping material. The robot control system may comprise input/output interfaces configured to be communicatively coupled to the industrial robots, to one or more coil rollers, and/or to a human/machine interface for example in the form of a GUI generating a dashboard.

The robot arm may be configured as an elongate beam having the coupling robot piece mounted at the end of the beam.

The coupling robot pieces may be configured to be able to convey actuating power from a power supply line of any of the robots.

The coupling between said robots and said robot tool may be in the form of a robot tool changer with the coupling tool pieces of the robot tool configured to be able to mate with coupling master piece mounted on each robot arm.

The robot arms may comprise a wrapping material clamp configured to hold a strip of wrapping material, preferably mounted close to the distal end of the robot arm.

In certain embodiments, the robot system may further comprise:
- a robot jig having a first and a second intersecting leg;
- a first leg of the robot jig being configured with a first and a second robot base mounts placed apart on the first leg;
- a second leg of the robot jig being configured with a first coil roller abutment placed at an end of the second leg.

The robot system may further comprise a first coil roller configured to give a coil placed in the first coil roller a rotating movement.

The robot jig may at its second leg further comprise a second coil roller abutment placed at the other end of the second leg.

The robot system may further comprise a second coil roller configured to give a coil placed in the second coil roller a rotating movement.

The robot system may further comprise a wrapping material clamping station placed substantially midway between said robots, said wrapping material clamping station being provided with a wrapping material clamp configured to hold a strip of wrapping material.

The robot system may include a wrapping material clamping station is placed substantially at the intersection of said first and second legs of the robot jig substantially midway between said robot base mounts, said wrapping material clamping station being provided with a wrapping material clamp configured to hold a strip of wrapping material.

The robot system may further comprise a roll magazine for storing a plurality of rolls of wrapping material available to one or more of the robots, the roll magazine being configured with a roll place and an associated wrapping material clamp for each roll of wrapping material, said wrapping material clamps being configured to hold a strip of wrapping material.

The robot system may further comprise a measuring system configured to measure the position and dimensions of a coil positioned on a coil roller for being packaged with a wrapping material, e.g. measure the outer and inner radius of the coil which may be used for determining the travel path for the robots and robot arm holding the roll with wrapping material. By measuring dimensions and taking into the rotational speed of the coil, e.g. a substantially constant rotational speed of the coil, the overlap for successive wrapping passes along the curved envelope surface of the coil may be determined by the determined travel path for each wrapping pass/turn.

The measuring system may comprise one or more laser measuring tools, for example mounted on one of or both robot arms.

In embodiments, the technology disclosed relates to a robot jig for coil packaging, comprising
a first and a second intersecting legs;
wherein
a first leg of the robot jig being configured with a first and a second robot base mounts placed apart on said first leg;
a second leg of the robot jig being configured with a first coil roller abutment placed at an end of said second leg.

The robot jig may further comprise a wrapping material clamping station placed substantially at the intersection of said first and second legs of the robot jig substantially midway between said robot base mounts, said wrapping material clamping station being provided with a wrapping material clamp configured to hold a strip of wrapping material.

The robot jig may further comprise a roll magazine for storing a plurality of rolls of wrapping material available to one or more of the robots, the roll magazine being configured with a roll place and an associated wrapping material clamp for each roll of wrapping material, said wrapping material clamps being configured to hold a strip of wrapping material.

In different embodiments, the method of coil packaging in a robot system may comprise a selection of:
placing a coil of sheet metal on a coil roller associated with a robot system for coil packaging;
measuring the position of the coil in relation to the industrial robots;
measuring the dimensions of the coil;
attaching a first turn of wrapping material rolled off from a roll of wrapping material attached to a robot tool;
wrapping the coil in a sequence of robot movements with handover of the robot tool with the roll of wrapping material from a first industrial robot to a second industrial robot; wherein a first handover phase takes place in a hollow cylindrical center core if the coil and a second handover phase takes place along an envelope surface of the coil;
finishing the wrapping by clamping a strip of the wrapping material and cutting the strip of wrapping material.

In embodiments, this disclosure describes methods, a robot system and an apparatus for wrapping all exposed surfaces of a large annular coil, including its hollow cylindrical core, in a number of wrapping cycles/laps/passes to prevent contamination and to prepare it for shipping. A pair of parallel robotic arms hand off or transfer a roll of wrapping material, such as a plastic stretch film, from a gripper on one arm to a gripper on the other arm. The arms travel around both ends of the coil, handing off the roll back and forth along the curved envelop surface of the coil and in the center of its hollow core, as it is slowly rotated by a constant-speed coil roller.

The speed of the coil roller may be substantially constant and the starting position in three-dimensional space for wrapping the curved envelops surface is controlled by the robot control system and adjusted for successive wrapping laps/passes such that the wrap defines a certain overlap during each successive pass around the coil, thereby ensuring its sealed integrity. The travel path of the robotic arms traveling around the coil is therefore slightly different for each successive pass and is adjusted to the relative height and width of each new coil to minimize wrap time and reduce wear and tear.

As mentioned above, the travel path and the displacement of the two robotic arms holding the robot tool from the hollow center core to the entry position along the envelope surface, or on the edge between the end surface and the envelope surface, of the robotics arm may then be different for successive wrapping passes, providing for a faster and more controlled wrapping process which permits a smaller and more accurately defined overlap of wrapping material. A controlled process where the starting/entry position along the edge between the first end surface and the curved envelope surface, rather than the rotational speed of the coil, is variable and different for successive wrapping passes reduces the risk of creases being formed in the film applied to the curved envelope surface of the coil, thereby providing for improved productivity and ensuring the sealed integrity of the coil.

In embodiments, the travel path and displacement in three-dimensional space of the robot arm holding the roll may be mutually different for at least ten successive wrapping laps/turns/cycles/passes. The entry/starting position along/on the edge to the curved envelope surface may then be different for successive wrapping laps/turns/cycles/passes, i.e. the distance from the hollow center core of the coil to the entry/starting position for the sequence of robotic movements for wrapping the curved envelope surface of the coil may then be different for at least ten successive wrapping laps/turns/cycles/passes.

The mutually different entry/starting positions along/on the curved envelope surface may then be adapted to the rotational speed, e.g. a substantially constant rotational speed, of the coil to define an overlap, i.e. the width of the overlap of wrapping material, between successive wrapping passes on the curved envelope surface. Both the entry/start and exit/end position for the sequence of robotic movements of the robot and robot arm holding the roll along the curved envelope surface may then be different for successive wrapping passes. Adapting the entry/start and exit/end positions in three-dimensional space along the curved envelope surface so that they are different for successive wrapping laps/passes/turns/cycles provides for a faster and more controlled wrapping process which permits a smaller and more accurately defined overlap of wrapping material and reduces the risk of creases being formed in the film applied to the curved envelope surface of the coil, for improved productivity and ensuring the sealed integrity of the coil.

The positions and movements in three-dimensional space for the respective roll holder shaft holding the roll defines the start position and end position for the application of the wrapping material on the curved envelope surface. The sequence of movements of the shaft along the curved envelope surface relative the constant rotational speed of the coil roller(s) thereby defines the width of the overlap on the curved envelope surface for between successive laps. By providing a solution where the coil is rotating at a substantially constant rotational speed, the width of the overlap between successive and adjacent strips may be better controlled to be substantially constant over the curved envelope surface.

In other embodiments, the rotational speed of the coil may vary over a wrapping pass/cycle and/or varies through the process of wrapping the coil. The rotational speed may then vary during a lap but may still be constant, or substantially constant, during the application of the wrapping material, e.g. film, on the curved envelope surface of the coil. In embodiments, the technology disclosed relates to a robot system comprising two industrial robots each comprising at least one robot arm adapted for wrapping a coil, the robot system comprising at least one actuator providing a sequence of movements of the at least one robot and/or robot arm.

In different embodiments, the robot system typically comprises a drive unit and a robot control system comprising a program storage for storing control programs including movement instructions for the two robots and the robot arms, a program executor adapted to execute the movement instructions for the robots, and a motion planner adapted to determine how the robots should move around the coil for each successive wrapping turn in order to be able to execute the movement instructions for the robots and on the bask thereon generate control signals to the drive unit.

The program storage is typically adapted to store control programs including movement instructions for the robot and the robot arms. The program executor is adapted to execute the movement instructions and the motion planner is adapted to determine, for each individual wrapping turn, how the two robot/robot arms should move around the coil in order to be able to execute the movement instructions.

In embodiments, the technology disclosed relates to a robot system device for wrapping a coil, comprising:
  a robot control system, comprising:
    at least one processor, and
    at least one memory including computer program instructions, the at least one memory and the computer program instructions configured, with the processor, to cause the robot system to: determine an individual travel path for each successive wrapping turn for the movements of the robots/robot arms in three-dimensional space along the surfaces of the coil based on received, modelled and/or measured dimensions and/or positions of the coil, the rotational speed of the coil and/or a determined/desired overlap between successive wrapping turns/passes on the curved envelope surface of the coil;
    cause the robots and/or robot arms to move along the surfaces of the coil based on the travel path for each successive wrapping turn, wherein the robot control system and
    computer program instructions are configured so that travel paths for each of the two robots and their respective at least one robot arm are different for successive wrapping turns.

In embodiments, the robots and their robot arms are run with controlled position, the at least one memory and the computer program instructions are further configured, with the processor, to cause the device to cause the robot to move along the travel path within a predetermined position offset.

In embodiments, the at least one memory and the computer program instructions are further configured, with the processor, to cause the robot control system to:
  obtain, from at least one of the two robot, e.g. just before or during a handover phase for handing over the robot tool, feedback information, such as sensor data, concerning a position of a first robot/robot arm or robot tool held by the first robot/robot arm relative the position of a second robot/robot arm;
  determine a deviation based on the relative position of the first and second robot/robot arm/robot tool; and
  determine a real-time adjustment of the position and/or the continued travel path of the first robot/robot arm or robot tool held by the first robot/robot arm based on the deviation.

In embodiments, wherein the at least one memory and the computer program instructions are further configured, with the processor, to cause the robot control system to:
  determine whether a deviation is greater than a predetermined threshold deviation; and in response to the deviation is greater than the predetermined threshold deviation, determine to stop the movement of at least one of the two robots.

Embodiments described herein are generally applicable in apparatus, system and methods for packaging articles with packaging material. The expressions packaging and packaging material are herein also synonymously used with the expressions wrapping and wrapping material since an article or object that is packaged by means of the disclosed embodiments is wrapped by relative movements of robot arms and/or of the article.

More specific embodiments described herein relate to a robot tool, system and method for packaging annular articles, such as coils of sheet metal, that are rotated while being packaged with a wrapping material. Such embodiments, preferably configured for use in a coil wrapping production line, is shown schematically in FIG. 1A to FIG. 1E.

Embodiments of a Robot Tool

Figure 1B:
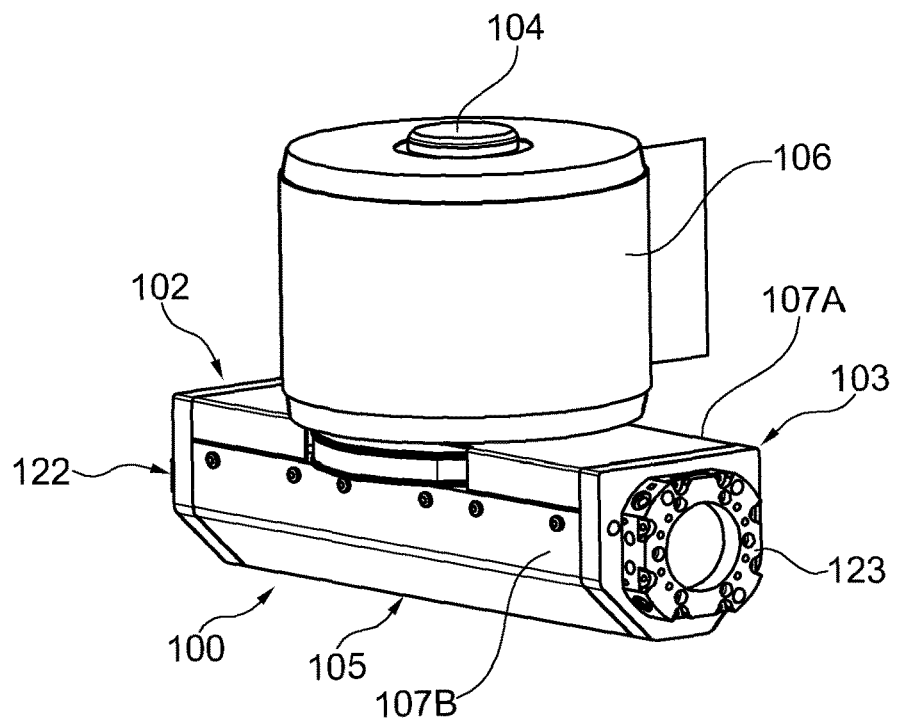
FIG. 1B illustrates schematically the embodiment of the robot tool shown in FIG. 1A with a roll of wrapping material placed on the roll holder shaft.
Figure 1C:
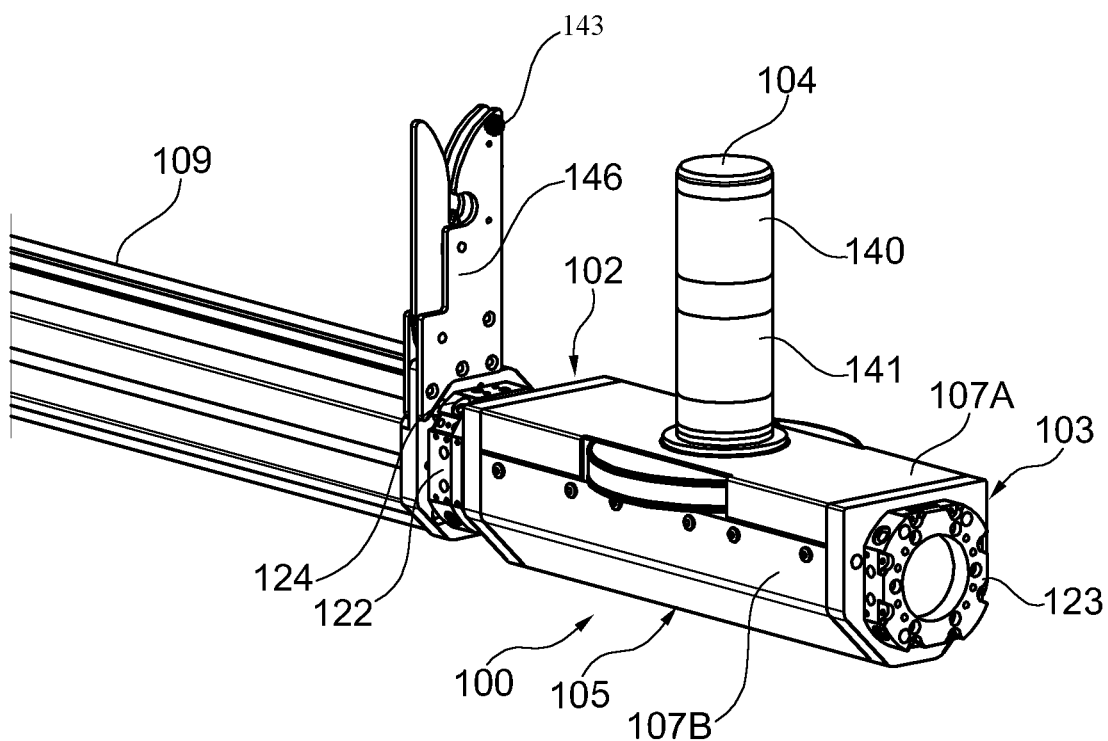
FIG. 1C illustrates schematically the embodiment of the robot tool shown in FIG. 1A and FIG. 1B coupled to a robot arm at one side or end of the robot tool.
Figure 1D:
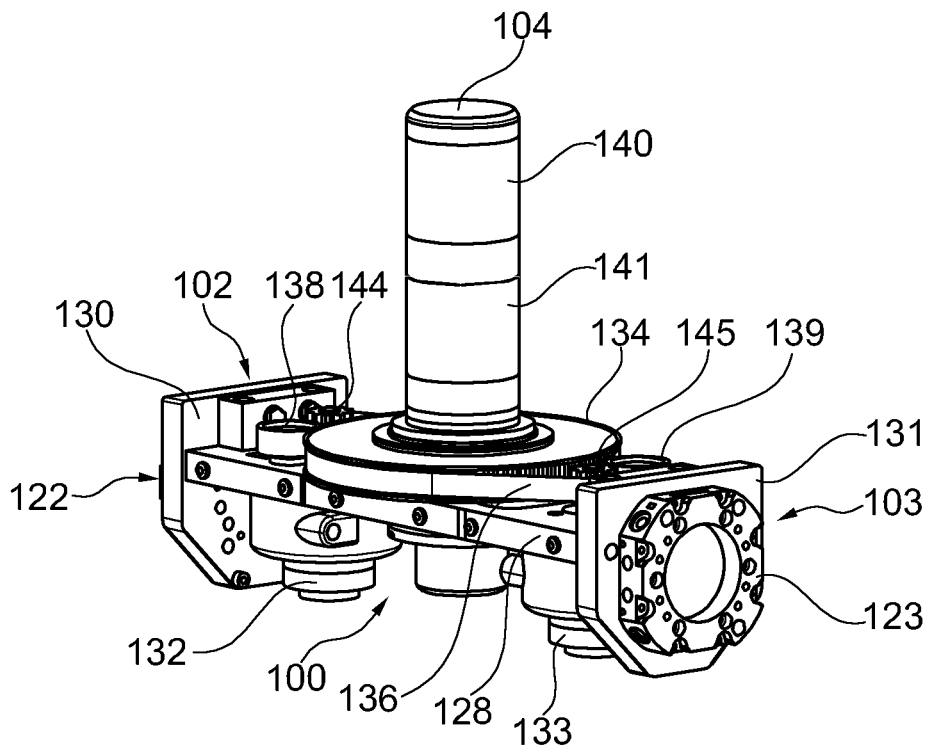
FIG. 1D illustrates schematically an embodiment of the robot tool shown in FIG. 1A-FIG. 1D in more detail.

FIG. 1A to FIG. 1E illustrate schematically an embodiment of a robot tool 100 provided with a roll holder shaft 104 for holding a roll 106 of wrapping material and being configured for handover between robot arms 108,109 of coordinated industrial robots 112,113 (Cf. FIG. 1D).

General embodiments of a robot tool 100 for coil packaging, comprises two, preferably opposing, ends 102,103 with each end being provided with a coupling tool piece 122,123 configured to interface with a robot arm 108,109. This embodiment further comprises a roll holder shaft 104 configured to hold a roll 106 of packaging material, the holder shaft 104 at one end being rotatably mounted substantially midway between said, preferably opposing, ends 102,103 and projecting substantially perpendicular to an axis extending between said, preferably opposing, ends 102,103. The robot tool 100 may be provided with a housing 105 comprising one or more cover plates 107A,107B.

In embodiments, the two ends are substantially mutually opposing ends, and the coupling tool pieces are preferably mounted on the respective ends such that the robot tool is substantially symmetrical. In certain embodiments, the holder shaft may be rotatably mounted substantially midway between said ends and projecting substantially perpendicular to an axis extending between said ends. The robot tool may then be generally T-shaped and have symmetric design to allow for an efficient operation and handling by two industrial robots.

In other embodiments of the robot tool, the coupling tool pieces may be arranged in other configurations, e.g. the holder shaft may be rotatably mounted offset from the midway point between the opposing ends and/or be projecting at an angle different from perpendicular to an axis extending between the two ends. As an example configuration of a robot tool according to certain aspects of the technology disclosed, the holder shaft may be projecting at a certain angle within an angle range of 75-88 degrees relative to an axis extending between the two opposing ends.

The angle for the projecting holder shaft relative the extending axis between the opposing ends may then be selected and designed for being used for wrapping a coil having a certain outer radius and which is rotated about its rotational axis at a certain substantially constant rotational speed while being packaged with a wrapping material. As an example, the angle for the projecting holder shaft holding the wrapping material relative the extending axis may be designed for a coil having a certain outer radius and which is rotated about its rotational axis, e.g. by drive rollers of a cradle carrying the coil, at a certain substantially constant rotational speed while wrapping the coil's envelope surface with the wrapping material.

In different embodiments, the rotational speed for the coil may be substantially constant during the whole wrapping of the annulus/coil or the rotational speed may vary in that the rotational speed used for wrapping of other surfaces than the wrapping of the envelope surface may vary and/or may be different from a substantially constant rotational speed used during the wrapping of the curved envelope surface of the coil with overlapping strips of wrapping material, e.g. overlapping strips of plastic stretch film.

FIG. 1B illustrates schematically the embodiment of the robot tool shown in FIG. 1A with a roll 106 of wrapping material placed on the roll holder shaft 104.

FIG. 1C illustrates schematically the embodiment of the robot tool shown in FIG. 1A and FIG. 1B coupled to a robot arm 108,109 (109 shown in FIG. 1C) at one side or end 102 of the robot tool 100. Embodiments of the robot arm 108,109 is provided with a coupling robot piece 124,125 for example a gripper or a master piece of a tool changer, configured to be able to grip or mate with a coupling tool piece 122,123 of the robot tool 100. As shown in the embodiment of FIG. 1C, a robot arm 109 is coupled to the robot tool 100 via a coupling robot piece 124 that is mated with the robot tool piece 122 to the left in FIG. 1C at one end 102. At another end 103 of the robot tool 100, to the right in FIG. 1C, a second coupling tool piece 123 is available for coupling to another robot arm 108 not shown in FIG. 1C.

FIG. 1D illustrates schematically an embodiment of the robot tool shown in FIG. 1A-FIG. 1C in more detail and without the cover of the housing 105 shown in FIG. 1A to FIG. 1C. In the embodiment of FIG. 1D, the robot tool 100 comprises a carrier piece 128 with an end piece 130,131 attached to the carrier piece 128 at the respective ends 102,103 of the robot tool 100. Coupling tool pieces 122, 123 are attached to the end pieces 130,131 at the respective, preferably opposing, ends 102,103 of said carrier piece 128. Thus, in embodiments there is comprised a carrier piece 128 where the coupling tool pieces 122,123 are each mounted at the respective ends of the carrier piece 128.

The coupling tool pieces 122,123 are configured to be able to convey actuating power from a power supply line of a robot, such as an industrial robot. The actuating power may in different embodiments for example be in the form of pneumatic power, hydraulic power or electric power. In embodiments as illustrated FIG. 1A to FIG. 1D, the actuating power is preferably pneumatic power. The coupling may typically be configured to be couplable by a bayonet coupling and/or locked in position by means of actuation power controlled by the respective robots.

In embodiments the coupling configured for interfacing between the industrial robots and the robot tool is configured in the form of a robot tool changer with the coupling tool piece 122,123 configured to be able to mate with a coupling master piece 124, 125 of said tool changer mounted on a respective robot arm.

In embodiments of the robot tool, and shown in FIG. 1A-FIG. 1D, the roll holder shaft 104 further comprises a roll fixture 140,141 configured to releasably fix a roll of wrapping material to said roll holder shaft. For example, a portion 140,141 of the roll holder shaft is configured to be radially expandable to enable a roll fixture to releasably fix a roll of wrapping material to said roll holder shaft. In embodiments, this is implemented as one or more inflatable bladders 140,141 that are controllably inflatable by means of pneumatic power, i.e. pressurized air, conveyed from the respective robots via the coupling interfaces. In other embodiments, the roll fixture 140,141 is actuatable for example by electric or hydraulic power.

Figure 1E:
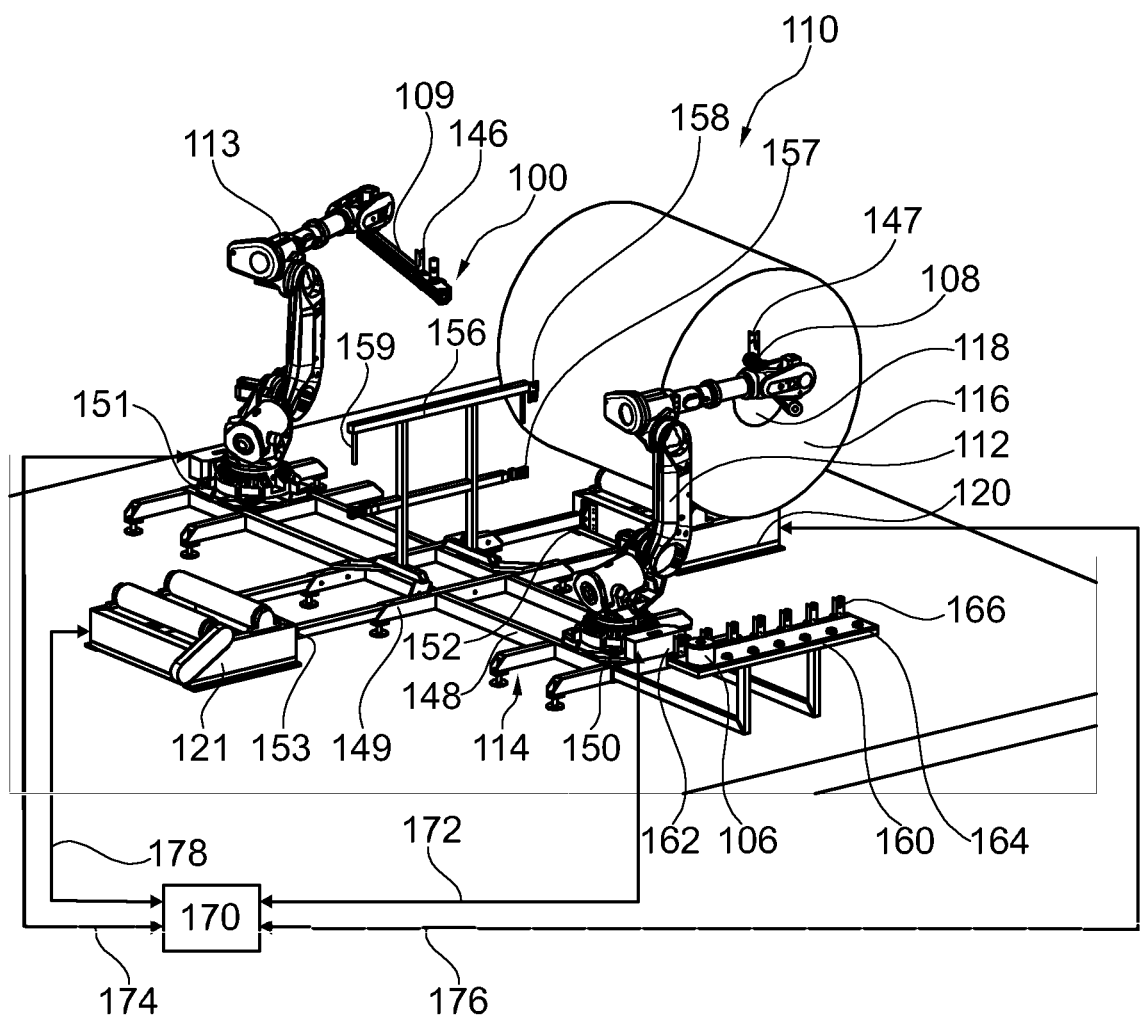
FIG. 1E illustrates schematically an embodiment of a robot system comprising an embodiment of the robot tool shown in FIG. 1A to FIG. 1D and configured to wrap a rotating annular object, e.g. a coil of sheet metal.

Embodiments of the robot tool 100 further comprises at least one motor 132,133 configured to drive, prevent and/or brake rotation of the roll holder shaft. As shown in the embodiment of FIG. 1E, a pneumatic motor 132,133 is mounted on the carrier piece 128 at each side of the roll holder shaft 104. The roll holder shaft 104 is provided with a sprocket 134 configured to be engaged by a toothed belt 136. The toothed belt 136 is also engaged with sprockets 144,145 coupled to the respective motor 132,133 and is biased by tension wheels 138,139 preferably mounted as backside idlers on the toothed belt 136.

The embodiments of the robot tool shown in FIG. 1A-FIG. 1D have a basically symmetrical configuration. When a first robot arm is coupled to the robot tool 100 at, for example, the right side of the tool (in FIG. 1D) to the coupling tool piece 123, the motor 133 and the roll fixture 140,141 are actuated by means of pneumatic power, i.e. pressurized air, supplied from the first robot arm (or first robot) via the coupling tool piece 123. When a second robot arm is coupled to the robot tool at the left side of the tool to the coupling tool piece 122, the motor 132 and the roll fixture 140,141 are actuated by means of pneumatic power from the second robot arm via the coupling tool piece 122. During a phase, typically a handover phase, when the first robot and the second robot are both engaged with the robot tool, the motors 132, 133 and roll fixture 140,141 are simultaneously actuated or actuatable by the respective first and second robots. In other embodiments, the motors 132, 133 and/or the roll fixture 140,141 are actuatable for example by electric or hydraulic power.

An embodiment of a robot tool for coil wrapping, comprising:
  a carrier piece having two opposing ends, each end being provided with a tool piece of a robot tool changer configured to interface by mating with a corresponding master piece of a tool changer of a robot arm;
  a roll holder shaft configured to hold a roll of wrapping material, the holder shaft at one end being mounted on said carrier piece between said opposing ends and projecting substantially perpendicular to an axis extending between said opposing ends.

In embodiments, the tool changers of the above robot tool are configured to be able to convey actuating pneumatic power from a pneumatic power supply line of a robot when mated;
  wherein a portion of the roll holder shaft is configured to be radially expandable by said pneumatic power to enable a roll fixture to releasably fix a roll of wrapping material to said roll holder shaft;
  at least one pneumatic motor is mounted on the carrier piece, coupled to said roll holder shaft and configured to drive, prevent and/or brake rotation of said roll holder shaft by said pneumatic power.

In embodiments, the technology disclosed relates to a robot tool for coil wrapping, comprising:
  a carrier piece having two opposing ends, each end being provided with a tool piece of a robot tool changer configured to interface by mating with a corresponding master piece of a tool changer of a robot arm;

a roll holder shaft configured to hold a roll of wrapping material, the holder shaft at one end being mounted/positioned on said carrier piece substantially midway between said opposing ends and projecting substantially perpendicular to an axis extending between said opposing ends;

wherein:
the tool changers are configured to be able to convey actuating pneumatic power from a pneumatic power supply line of a robot when mated;
wherein a portion of the roll holder shaft is configured to be radially expandable by said pneumatic power to enable a roll fixture to releasably fix a roll of wrapping material to said roll holder shaft;
at least one pneumatic motor is mounted on the carrier piece, coupled to said roll holder shaft and configured to drive, prevent and/or brake rotation of said roll holder shaft by said pneumatic power.

In embodiments, the technology disclosed relates to a robot tool for coil wrapping, comprising:
a carrier piece having two opposing ends, each end being provided with a tool piece of a robot tool changer configured to interface by mating with a corresponding master piece of a tool changer of a robot arm;
a roll holder shaft configured to hold a roll of wrapping material, the holder shaft at one end being mounted/positioned on said carrier piece between said opposing ends, e.g. substantially midway between said opposing ends, and projecting at a certain angle within an angle range of 75-88 degrees relative to an axis extending between the two opposing ends.

In certain embodiments, the tool changers of the robot tool having a holder shaft projecting within an angle range of 75-88 degrees relative to an axis extending between the two opposing ends are configured to be able to convey actuating pneumatic power from a pneumatic power supply line of a robot when mated;
wherein a portion of the roll holder shaft is configured to be radially expandable by said pneumatic power to enable a roll fixture to releasably fix a roll of wrapping material to said roll holder shaft;
at least one pneumatic motor is mounted on the carrier piece, coupled to said roll holder shaft and configured to drive, prevent and/or brake rotation of said roll holder shaft by said pneumatic power.

Embodiments of a Robot System

FIG. 1E illustrates schematically an overview of an embodiment of a robot system 110, in this example comprising an embodiment of the robot tool shown in FIG. 1A to FIG. 1D, and configured to wrap a rotating annular object, e.g. a coil of sheet metal 116. Embodiments of the robot system 110 may be configured to operate with other embodiments of the robot tool.

In embodiments, the technology disclosed relates to a robot system for coil packaging, comprising:
a. two industrial robots 112,113, each robot being provided with a robot arm 108,109 having a coupling robot piece 124,125 (125 not shown in FIGs) configured to interface with a robot tool, and
b. a robot tool 100.

The robot tool 100 typically have two ends 102,103, where each end may be provided with a coupling tool piece 122,123 configured to interface with a said robot arm 108,109, and a roll holder shaft 104 configured to hold a roll of packaging material 106. The roll holder shaft 104 at one end being mounted between said ends 102,103 and projecting at certain angle which is substantially perpendicular to an axis extending between said ends 102,103, or within an angle range of 75-88 degrees relative the axis extending between said ends 102,103.

In the embodiment illustrated in FIG. 1A to 1D, the roll holder shaft 104 is mounted substantially midway between said opposing ends 102,103 and is projecting substantially perpendicular to an axis extending between said ends 102, 103. In embodiments of the robot system, the robot arm 108,109 is configured as an elongate beam having said coupling robot piece 124,125 mounted at the end of the beam. The coupling robot pieces 124, 125 are configured to be able to convey actuating power from a power supply line of any of said robots. As mentioned above, the actuating power is in preferred embodiments compressed air in a pneumatic system. In other embodiments, the actuating power may for example be electric power or hydraulic power. In embodiments, the coupling between said robots 112,113 and said robot tool 100 is in the form of a robot tool changer with the coupling tool pieces 122,123 of the robot tool 100 configured to be able to mate with coupling master piece 124,125 mounted on each robot arm 108,109.

In embodiments, the robot is configured to reduce or shut off the actuating power, e.g. pneumatic power or hydraulic power, used for controlling the coupling robot piece 124, 125 holding the robot tool before the handover phase at a certain distance from the position of handover, i.e. when the robot tool is still gripped or held by only the robot handing over the robot tool to another robot. The distance from the position of the handover when the actuating power for controlling coupling robot piece 124, 125 is reduced or turned off may typically be at a distance within a distance interval of 20-200 mm from the position of handover, e.g. within a distance interval of 20-200 mm from a position for each portion of the robot tool when the robot tool is first held by both robots. In certain embodiments, the robot control system 170 of the robot system, which is configured to control the movement of the robots 112,113 in relation to a coil 116, may then be further configured to also control the reduction or shutting off of the actuating power at a certain distance from the handover position. Shutting off the actuating power of the robot arm holding the robot tool at a distance from the handover position provides for faster handover and a faster process for wrapping the coil.

In an example embodiment where the actuating power for controlling the coupling robot piece 124, 125 is completely switched off before handover, the robot tool is held by and locked to the coupling robot piece 124, 125 solely by mechanical force, e.g. solely by mechanical spring tension.

The provision of a robot system where the coupling robot piece 124, 125 of the robot handing over the tool is controlled by reducing or shutting off the actuating power before handover may enable a flying handover of the robot tool, i.e. where the robot arms of the respective robot is in motion during the whole handover, or that the time period at the handover position when the two robots arms are both stationary, i.e. are not moving, may be significantly reduced, thereby providing for a shorter (faster) handover, a shorter (faster) wrapping cycle and improved productivity. As shown in FIG. 1C, the robot arms 108,109 each comprises a wrapping material clamp 146,147 configured to hold a strip of wrapping material, preferably mounted close to the distal end of said robot arm 108,109.

Embodiments of the robot system 110, further comprises: a robot jig 114 having a first 148 and a second 149 intersecting leg. A first leg 148 of the robot jig 114 is configured with a first 150 and a second 151 robot base mounts placed apart on said first leg 148. A second leg 149 of the robot jig 114 is configured with a first coil roller abutment 152 placed at an end of said second leg 149.

Embodiments of the robot system further comprises a first coil roller 120 configured to give a coil 116 placed in said first coil roller 120 a rotating movement. In embodiments configured with two coil stations, and as shown in FIG. 1E, the robot jig 114 at its second leg 149 further comprises a second coil roller abutment 153 placed at the other end of said second leg 149. Such embodiments further comprise a second coil roller 121 configured to give a coil (not shown) placed in said second coil roller 121 a rotating movement.

The robot jig 114 in the shown embodiments is thus configured with two robot base mounts 150,151 placed apart on a first leg of the cross geometry as well as a first and a second coil roller abutment 152,153 placed apart on a second leg of the cross geometry. A first 112 and a second 113 industrial robots are mounted on the respective robot base mounts 150,151. A first 120 and a second 121 coil roller are placed to the respective coil roller abutments 152,153. Such coil rollers 120,121 are per se known and typically comprises a cradle of two rollers that are actuatable to give a coil placed in the cradle a rotating movement about the rotational axis of the coil. In embodiments and when placed in the cradle, the rotational axis of the coil is typically perpendicular to the gravitational axis. An annular article schematically illustrating a coil of sheet metal 116 with a hollow cylindrical center core 118 is placed on the first coil roller 120. Each of the industrial robots 112, 113 comprises a robot arm 108,109 configured to be couplable to a robot tool 100 at each end.

Coils of sheet metal appear in different sizes. A large coil may have a length of 2300 mm, normal sizes are in the range of 1200 to 1500 mm length and down to a minimum that may be 800 mm length. The hollow center core often has an inner diameter of 508 or 610 mm, and there are diameters as small as 420 mm. The outer diameter of a coil may vary from for example 1 to 2.5 meters.

In the embodiment shown in FIG. 1E, the robot jig 114 is configured with a general cross geometry of substantially perpendicular legs with one or more bars, i.e. the bars making up the legs and thus the one or more bars intersecting at substantially right angles. Other intersecting angles may be configured with adapted configurations of the robots, their range and their movements. In the shown embodiment visible in FIG. 1E, each leg comprises two parallel bars.

In embodiments, the two industrial robots 112,113 of the robot system and the robots of the technology disclosed may further be configured to tilt the longitudinal axis of the roll 106, or roll holder shaft 104, and then keep the longitudinal axis of the roll, and/or roll holder shaft 104, at a certain angle with respect to the direction of rotation along the envelope surface so that the longitudinal axis of the roll 106 and/or roll holder shaft 104 is kept tilted at an angle relative the direction of rotation of the curved envelope surface area where the wrapping material, e.g. stretch film, is transferred from the roll holder shaft to the envelope surface and applied to the coil.

The cradle carrying the coil may comprise means, e.g. at least one drive roller, configured to rotate the coil about its rotational axis at a certain rotational speed. The angle of the longitudinal axis of the roll 106, and/or roll holder shaft 104, relative the direction of rotation may then be further selected, adapted and/or optimized with respect to the rotational speed of the coil, e.g. adapted to an estimated angular velocity for the outer radius of the coil and/or the angular velocity of the envelope surface where the wrapping material is applied to the coil. In embodiments, the at least one drive roller may rotate the coil about its rotational axis at a constant rotational speed throughout the whole sequence of movements of the two robots along the envelope surface, including the handover phase along the envelope surface.

Embodiments of the robot system 110, further comprises a wrapping material clamping station 156 placed substantially midway between said robots 112,113, said wrapping material clamping station 156 is provided with one or more wrapping material clamps 157,158 configured to hold a strip of wrapping material. The wrapping material clamping station 156 is preferably placed substantially at the intersection of said first and second legs 148,149 of the robot jig 114 substantially midway between said robot base mounts 150,151, said wrapping material clamping station 156 being provided with one or more wrapping material clamps 157, 158 configured to hold a strip of wrapping material.

In embodiments, the robot system 110 further comprises a roll magazine 160 for storing a plurality of rolls 106 of wrapping material available to one or more of the robots. The roll magazine 160 is configured with one or more roll places 164 and an associated wrapping material clamp 162,166 for each roll of wrapping material, said wrapping material clamps 162,166 being configured to hold a strip of wrapping material.

Embodiments of the robot system 110 further comprises a measuring system configured to measure the position and dimensions of a coil 116 positioned on a coil roller 120,121 for being packaged with wrapping material. In embodiments, the measuring system comprises one or more laser measuring tools 143, for example mounted on one of or both robot arms 108,109 (Cf. FIG. 1C). With such a laser measuring tool mounted on the robot arm, it is preferable that it is positioned such that is has an optical line that is unobstructed by a roll of wrapping material attached to the robot tool. When measuring the position and dimensions, the robot system is configured to find the center of the coil, follow the contours and calculate the position and the dimensions.

The robot system 110, in embodiments, further comprises a robot control system 170 configured to control the movement of the robots 112,113 in relation to a coil 116 positioned on a coil roller 120,121 in the robot system for being packaged with a wrapping material. The robot control system comprises input/output interfaces configured to be communicatively couplable to the industrial robots 112,113, to one or more coil rollers 120,121, and/or to a human/machine interface (not shown) for example in the form of a GUI generating a dashboard.

Embodiments of Method for Coil Wrapping

In an overview of operation during a wrapping sequence, a first robot 112 with a first robot arm 108 coupled to a first side of the robot tool 100 carries the robot tool 100 loaded with a roll 106 of wrapping material, inserts the robot tool into the cylindrical center core 118 to a position where the second robot with the second robot arm 109 couples to the second side of the robot tool 100. The robot tool 100 is handed over to the second robot 112 which in its turn transports the robot tool 100 out of the center core 118 along the base of the cylindrical coil 116 and along its envelope surface all while the wrapping material is unfolding or reeling up from the wrapping material roll 106. The robot tool 100 is then handed over from the second robot 113 back to the first robot 112, and the cycle is repeated. During the wrapping cycle the coil roller 120 is rolled in a tempo coordinated with the movements of the robots to achieve an overlapping wrapping of the coil 116, i.e. a portion of the strip of wrapping material is overlapped with a previous strip of wrapping material at least on the curved envelope surface of the coil 116. To securely cover the entire surface of the coil 116, e.g. to securely cover at least the entire envelope surface of the coil 116, an overlap, e.g. predetermined overlap, of adjacent strips of wrapping material from consecutive wrapping cycles is achieved. Thus, the wrap overlaps at least on the envelope surface of the coil during each successive pass around the coil 116, thereby ensuring its sealed integrity.

In certain embodiments, the cradle may be configured to rotate the coil at a substantially constant rotational speed throughout the whole process of wrapping the coil. The cradle may then be configured to rotate the coil at a substantially constant rotational speed or the control system of the robot system may be configured to control the cradle and the means for rotating the coil so that the rotational speed of the coil varies over a wrapping pass/cycle and/or varies through the process of wrapping the coil. A substantially constant rotational speed throughout the whole process for wrapping the coil, or at least during the wrapping of the curved envelope surface of the coil, is beneficial in providing for a better controlled process, which reduces the risk of creases in the wrapping material, e.g. stretch film, and in addition, enables a smaller overlap between consecutive strips of wrapping material, further that the average (constant) rotational speed may be maintained at a relatively high value throughout the process of wrapping the coil, thereby providing for shorter (faster) wrapping cycles including faster handovers along the envelope surface of the robot tool and an overall faster wrapping process for improved productivity.

The technical effects of tilting the longitudinal axis of the roll holder shaft at an angle relative the direction of rotation of the coil include that a better controlled and more even and adequate tensioning of the film is achieved when transferring the film from the roller tool to the envelope surface of the coil, thereby reducing the risk of creases being formed in the stretch film applied on the envelope surface. A better controlled and more even and adequate tensioning of the stretch film when transferring the film from the roller tool to the envelope surface of the coil may also permit a more efficient wrapping of the envelope surface by enabling the use of a smaller overlap between consecutive strips of stretch film applied to the envelope surface during consecutive wrapping cycles, thereby reducing excessive usage of stretch film. A better controlled and more even and adequate tensioning of the film may also enable a faster movement of the robot arm holding the robot tool as the risk of creases formed in the film applied on the envelope surface is reduced, and thus, enable faster handovers and shorter (faster) wrapping cycles for improved productivity.

The tilting of the longitudinal axis of the roll 106, and/or roll holder shaft 104, at an angle relative the direction of rotation of the coil enables that the robot system may rotate the coil at a substantially constant and relatively high rotational speed which provides for higher throughput, yet reduces the risk of creases being formed in the film applied on the curved envelope surface of the coil. A substantially constant rotational speed, or angular velocity, for the area on the envelope surface where the film is applied provides for a better controlled process when transferring the film from the roll 106 to the envelope surface and a more accurate positioning and application of the film to the envelope surface, e.g. enabling that a smaller overlap between consecutive strips may be used.

In embodiments, the direction of travel of the roll 106 and/or robot tool 104 along the envelope surface is substantially parallel with the rotational axis of the coil and the roll axis or roll holder shaft 104 of the robot tool is held by the respective robot at a certain angle with respect to the direction of rotation of the coil. In this embodiment, the respective robot holding the robot tool maintain the longitudinal axis of the roll holder shaft 104 at the substantially same angle with respect to the direction of rotation of the coil throughout the whole handover phase along the envelope surface.

In certain embodiments, the angle of the longitudinal axis of the roll 106 and/or the roll holder shaft 104 relative the direction of rotation of the coil may be adapted to and/or dependent on the rotational speed of the coil, e.g. adapted to a substantially constant rotational speed used during the wrapping of the envelope surface or which is used throughout the whole process of wrapping the coil. In certain embodiments, the selected inclination angle of the longitudinal axis of the roll holder shaft 104 relative the direction of rotation of the coil is within an angle range of 2 to 30 degrees, where the inclination angle may be adapted to and depend on the rotational speed of the coil and/or the direction of travel of the robot tool relative the direction of the rotational axis of the coil.

In embodiments, the longitudinal axis of the roll or roll holder shaft 104 is tilted, by the robot arm of the industrial robot holding the robot tool, to a desired inclination angle relative the direction of rotation of coil while holding the robot tool with the unfolding roll after the handover phase in the hollow cylindrical center core of the coil and before the robot tool reaches the envelope surface and the sequence of robot movements for transferring the film to the envelope surface of the coil begins. The longitudinal axis of the roll holder shaft may then be tilted relative the direction of rotation for the surface area on the envelope surface where the film is to be applied and while moving the robot tool along the end surface of the coil.

According to certain embodiments, the rotational axis of the coil is typically substantially perpendicular to the gravitational axis and the coil rotates about its rotational axis at a substantially constant rotational speed when the film is to the envelope surface of the coil. The introduction of a robot system and robot tool which are adapted and configured for tilting the longitudinal axis of the roll holder shaft of the robot tool at an angle relative the direction of rotation of the coil provides a solution where at least one drive roller of the cradle carrying the coil may rotate the coil at a substantially constant rotational speed which, in turn, provides for a better controlled and faster wrapping process. The technology disclosed thereby provides a solution for which there is less need for varying the rotational speed of the coil during a wrapping cycle, at least during application of the film to the envelope surface of the coil.

In embodiments, the robot system of the technology disclosed is configured to adjust both the vertical position and the lateral position of the robot tool after before reaching the envelope with the purpose of maintaining a more even tensioning in the film during the transferring of the film from the robot tool to the curved envelope surface.

Figure 2:
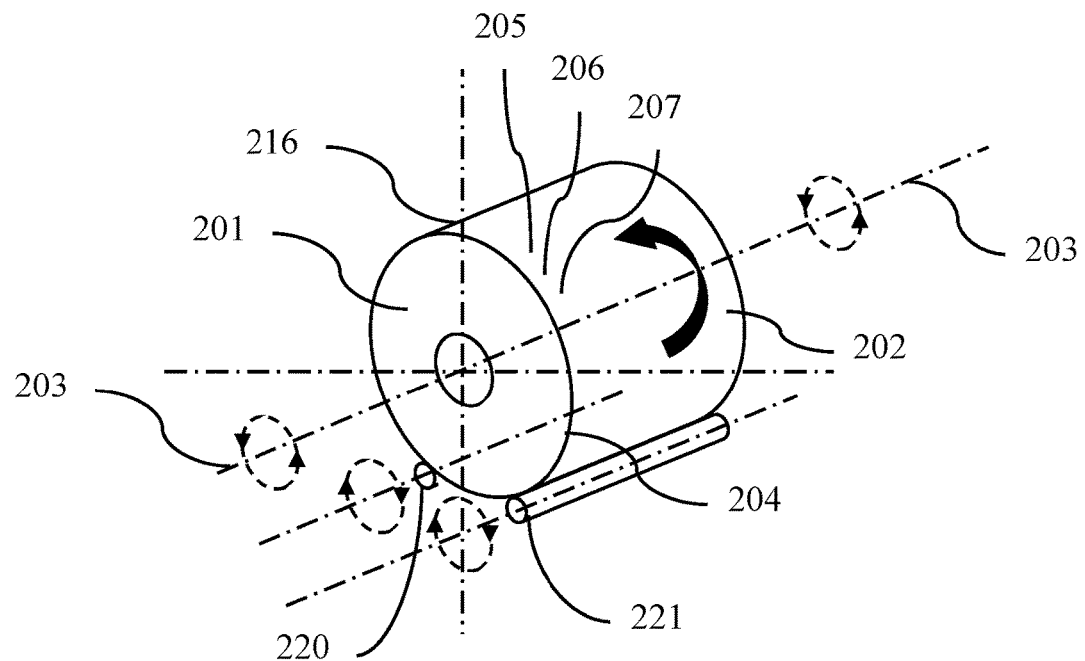
FIG. 2 illustrates an example embodiment of a system and method for wrapping a coil.

FIG. 2 illustrates a coil of sheet metal 216 having a first end surface 201 and a curved envelope surface 202. A pair of rollers 220, 221 give the coil 200 placed in the cradle (not shown) a rotating movement about the rotational axis 203 of the coil.

In the embodiment shown in FIG. 2, the position in three-dimensional space 206 for the robot arm of a first robot holding the roll of wrapping material along and outside a first outer circumferential edge 204 of the coil, is a different position in three-dimensional space relative a corresponding position 205 for the robot arm of the first robot in three-dimensional space along and outside said first outer circumferential edge 204 for the immediately preceding wrapping turn. The position in three-dimensional space 207 along and outside a first outer circumferential edge 204 of the coil for the next wrapping turn, is, in turn, a different position in three-dimensional space relative the position in three-dimensional space 206 for the current wrapping turn.

Figure 3:
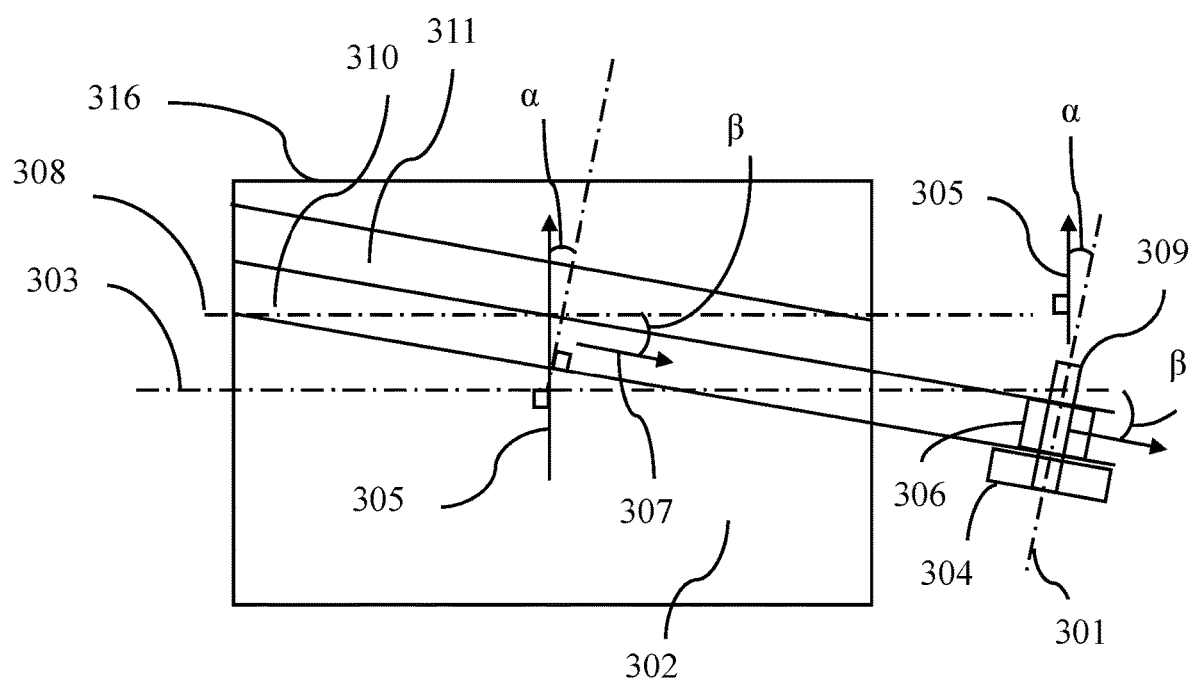
FIG. 3 illustrates an example embodiment of a system and method for wrapping a coil.

FIG. 3 illustrates a coil of sheet metal 316 in rotating movement about its rotational axis 303 and during application of the wrapping material on a roll 306 to the curved envelope surface 302 of the coil 316 in successive wrapping passes and overlapping strips 310, 311 of the wrapping material. The roll 306 of wrapping material rotates about a roll holder shaft 309 of a robot tool 304 to unroll the wrapping material in a controlled manner.

In the embodiment shown in FIG. 3, the longitudinal axis 301 of the roll holder shaft 309 of the robot tool 304 holding the roll 306 is directed in an inclined angular direction a relative the direction of rotation 305 of the coil. In FIG. 3, the longitudinal axis 301 of the roll holder shaft 309 is positioned and maintained in a substantially constant angular direction a relative the direction of rotation 305 of the coil and the sub-area of the curved envelope surface to which the wrapping material is applied.

As illustrated in FIG. 3, the roll of wrapping material is moved along the curved envelope surface so that the direction of travel 307 of the roll and the respective robot arm holding the robot tool along the curved envelope surface is in a direction at an angle (3 relative an axis 308 along the curved envelope surface which is parallel to the rotational axis 303 of the coil.

In different embodiments of the technology disclosed, the direction of travel 307 for the respective robot and robot arm holding the roll along the curved envelope is in a straight direction and may be at an angular direction 13 within the angle range of 0.1 to 15 degrees relative an axis 308 along the curved envelope surface which is parallel to the rotational axis 303 of the coil.

In the method of wrapping the coil, consecutive strips of wrapping material overlap which are applied on the curved envelope surface of the coil during consecutive laps overlap so that a section of the wrapping material of a subsequent strip partially overlaps the preceding strip.

Embodiments of a method of coil packaging in a wrapping station with a robot system as described above, comprises a selection of:
  Placing a coil of sheet metal on a coil roller associated with a robot system for coil packaging.
  Typically, the coil of sheet metal is transported from the manufacturing line to the wrapping station by means of an overhead crane or other crane or fork-lift.
  Measuring the position of the coil in relation to the industrial robots.
  Once a coil is placed in the wrapping station and a wrapping operation is started, the position of the coil is measured by the measuring system. In embodiments, this is carried out by one or both robots scanning the contours of the coil by means of the laser measuring tool 140.
  Measuring the dimensions of the coil.
  In conjunction with the position measuring or as a separate phase the dimensions of the coil is measured. Similarly in embodiments, the dimension measuring is carried out by one or both robots scanning the contours of the coil by means of the laser measuring tool 140.
  Attaching a first turn of wrapping material rolled off from a roll of wrapping material attached to a robot tool.

In order to fasten the first turn of wrapping material, an end strip of the wrapping material is fastened to one of the wrapping material clamps 157,158 on the wrapping material clamping station 156. With the end strip held in clamp, the first robot 112 holding the robot tool loaded with the roll of wrapping material moves the robot tool along the envelope surface of the coil, along the first side of the coil and into the hollow cylindrical center core of the coil all while the wrapping material unfolds or rolls off from the roll 106. Inside the center core, the second robot 113 with its robot arm couples to the robot tool in a first handover phase. The first robot releases the robot tool and moves back out of the hollow center core and up in front of the envelope surface of the coil to prepare for a second handover phase. Meanwhile, the second robot 113 now holding the robot tool with the roll of wrapping material moves out of the hollow center core, along the second side of the coil and along the envelope surface of the coil. The first robot 112 again engages and couples to the robot tool 100 and moves together with the second robot in a second handover phase until the second robot releases the robot tool 100. In this first fastening sequence, the second turn of wrapping material overlaps with the first turn and locks the wrapping material. The clamped end strip is then released from the wrapping material clamp.

The handover phases may for example last in the order of ½ to 5 seconds during a coordinated movement where the robot tool is displaced about 5 to 30 centimeters, preferably close to 15 cm.

Wrapping the coil in a sequence of robot movements with handover of the robot tool with the roll of wrapping material from the first industrial robot 112 to the second industrial robot 113; wherein a first handover phase takes place in the hollow cylindrical center core if the coil and a second handover phase takes place along an envelope surface of the coil.

The robots 112,113 continues the wrapping movement as described in the previous section. The coil roller maintains a rolling movement of the coil such that each turn of wrapping material on one hand partly overlap with the previous turn and on the other hand.

Finishing the wrapping by clamping a strip of the wrapping material and cutting the strip of wrapping material.

When the coil has been fully wrapped, a strip of the wrapping material is clamped in the clamping station 156 and the strip is cut. For the purpose of cutting the wrapping material, a strip of the wrapping material is turned around a shaft 159 at the clamping station 156, in order to keep track of where the wrapping material is in the robot space, and thereafter the strip is cut. Before cutting the strip of wrapping material, the strip is also held by the clamp 146,147 of one of the robot arms 108,109 so that the remaining wrapping material on a roll 106 on the robot tool is ready for a new wrapping procedure. A lose end strip of the wrapping material turned around the coil is preferably arranged to tack to the wrapping by self-adhesive properties. The wrapping material is usually a stretch film in a plastic material.

After the wrapping operation in the wrapping station a crane or similar is used to lift out the wrapped coil to an after-processing station where supplementing packing operations are carried out manually or semi-automatically.

In embodiments, the method is further comprising:
    wrapping the curved envelope surface, or cylindrical surface, of the coil by holding, by the respective first and second industrial robot, the longitudinal axis of the roll holder shaft tilted with respect to the direction of rotation of the coil on the curved envelope surface area where the film is applied on the coil.

The roll holder shaft may then be held tilted by the respective first and second industrial robot while moving the robot tool along the curved envelope surface to apply the film on the curved envelope surface, i.e. before, during and after the second handover phase, thereby reducing the risk of creases being formed in the film applied on the envelope surface of the coil.

In embodiments, the longitudinal axis of the roll holder shaft may then be tilted by the second industrial robot while moving the robot tool along a first end surface of the coil and before the sequence of robot movements for wrapping the curved envelope surface of the coil begins.

In embodiments, the longitudinal axis of the roll holder shaft is tilted at an angle within the angle range of 2 to 30 degrees with respect to the direction of rotation of the coil on the curved envelope surface area, or cylindrical surface area, where the film is applied on/to the coil.

In embodiments, the longitudinal axis of the roll holder shaft is straightened/adjusted by the first industrial robot so that it is pointing upwards and directed substantially parallel to the gravitational axis when entering the hollow cylindrical center core from a second end surface of the coil.

In different embodiments, the method of the technology disclosed further comprises rotating the coil about its rotational axis at a substantially constant rotational speed. The coil may then be rotated about its rotational axis by rotating at least one driver roller of the cradle.

In embodiments, the angular direction of the longitudinal axis of the roll holder shaft of the robot tool holding the roll is adjusted before reaching the edge between a first end surface and the curved envelope surface of the coil and while moving the robot tool along the first end surface of the coil.

In different embodiments, the method of wrapping the coil further comprises a selection of:
placing a coil of sheet metal on a coil roller associated with a robot system for coil packaging;
measuring the position of the coil in relation to the industrial robots;
measuring the dimensions of the coil;
attaching a first turn of wrapping material rolled off from a roll of wrapping material attached to a robot tool; and
finishing the wrapping by clamping a strip of the wrapping material and cutting the strip of wrapping material.

In embodiments, the method of the technology disclosed comprises:
wrapping the curved envelope surface, or cylindrical surface, of the coil by holding, by the respective first and second industrial robot, the longitudinal axis of the roll holder shaft tilted with respect to the direction of rotation of the coil on the curved envelope surface area where the film is applied on the coil.

In embodiments, the roll holder shaft is held tilted by the respective first and second industrial robot while moving the robot tool along the curved envelope surface to apply the film on the curved envelope surface, i.e. before, during and after the second handover phase, thereby reducing the risk of creases being formed in the film applied on the envelope surface of the coil.

In embodiments, the longitudinal axis of the roll holder shaft is tilted by the second industrial robot while moving the robot tool along a first end surface of the coil and before the sequence of robot movements for wrapping the curved envelope surface of the coil begins.

In embodiments, the longitudinal axis of the roll holder shaft is straightened/adjusted by the first industrial robot so that it is pointing upwards and directed substantially parallel to the gravitational axis when entering the hollow cylindrical center core from a second end surface of the coil.

In embodiments, the longitudinal axis of the roll holder shaft is tilted at an angle within the angle range of 2 to 30 degrees with respect to the direction of rotation of the coil on the curved envelope surface area, or cylindrical surface area, where the film is applied on the coil.

In embodiments, the method is further comprising:
rotating the coil about its rotational axis at a substantially constant rotational speed.

In embodiments, the coil is rotated about its rotational axis by rotating at least one driver roller of the cradle.

In embodiments, the first handover phase is performed in a first horizontal plane substantially perpendicular to the gravitational axis which is substantially parallel to the rotational axis of the coil and by said first industrial robot handing over the robot tool to said second industrial tool; and wherein said second handover phase is performed in a vertically translated second horizontal plane different from said first horizontal plane by said second industrial robot handing over the robot tool to said first industrial tool.

In embodiments, the method is further comprising:
adjusting, by the second industrial robot, both the lateral and the vertical position of the robot tool, in three-dimensional space, before the sequence of wrapping movements along the envelope surface of the coil by the second industrial robot begins and between the first handover phase and when the second industrial robot reaches the envelope surface of the coil.

In embodiments, both the lateral and the vertical position of the robot tool is adjusted by the second industrial robot while moving the robot tool along the first end surface of the coil.

In embodiments, the lateral position of each portion of the robot tool is adjusted by a distance which is greater than a distance corresponding to 75% of the outer radius of the coil and the vertical position of each portion of the robot tool is adjusted by a distance which is within a distance range corresponding to 2 to 30% of the outer radius of the coil.

In embodiments, the robot system comprises two industrial robots, each robot being provided with a robot arm having a coupling robot piece configured to interface with a robot tool having two ends, each end being provided with a coupling tool piece configured to interface with a said robot arm, and a roll holder shaft projecting substantially perpendicular to an axis extending between said two ends.

In embodiments, each of the two industrial robots is configured to tilt the longitudinal axis of the roll holder shaft of the robot tool with respect to the direction of rotation of a coil on the curved envelope surface area of the coil where the film is applied.

In embodiments, the two industrial robots are each configured to hold the longitudinal axis of the roll holder shaft of the robot tool at a substantially constant inclined angle relative the direction of rotation of the envelope surface area of the coil where the film is applied.

In embodiments, each of the two industrial robots are configured to hold the longitudinal axis of the roll holder shaft at a substantially constant angle relative the direction of rotation before, during and after a handover of the robot tool between the two industrial robots along the envelope surface.

In embodiments, a first industrial robot of the two industrial robots is configured to adjust both the lateral position and the vertical position of the robot tool it is holding before applying the film on the envelope surface of a coil, and wherein said adjustment of the vertical position of the robot tool is adapted to reduce the risk of forming creases in the applied film in that the vertical adjustment is in the same direction as the direction of rotation of the envelope surface area of the coil where the film is applied.

In embodiments, the first industrial robots is configured to move the robot tool between the hollow cylindrical center core and the envelope surface by adjusting the lateral position of the robot tool by a distance which is greater than a distance corresponding to 75% of the outer radius of the coil the robot system is currently wrapping and the vertical position of the robot tool by a distance which is within a distance range corresponding to 2 to 30% of the outer radius of the coil the robot system is currently wrapping.

In embodiments, the two industrial robots are each configured to adjust both the lateral and vertical position of the robot tool they are holding while moving along their respective first and second coil end surface.

In embodiments, the first and second industrial robot are both configured to receive instructions from the control system which cause the robot arm of the respective robot to move in the same horizontal plane during the first handover phase taking place in the hollow cylindrical center core of the coil.

In embodiments, the first and second industrial robot are both configured to receive instructions from the control system which cause the robot arm of the respective robot to hold the robot tool so that the roller holder shaft of the robot tool is directed substantially parallel to the rotational axis of the coil and substantially perpendicular to the gravitational axis along the path of travel for the two robot arms inside the hollow cylindrical center core of the coil.

In embodiments, the second plane of said second handover phase is at a different height position from said first plane of said first handover phase along the axis perpendicular to the rotational axis of the coil.

In embodiments, the height position along the gravitational axis perpendicular to the rotational axis of the coil is adjusted by the respective robot along the respective coil end surface, thereby reducing the risk of creases in the stretch film applied on the envelope surface of the coil.

In embodiments, the technology disclosed relates to a robot system for coil packaging, comprising:
two industrial robots, each robot being provided with a robot arm having a coupling robot piece configured to interface with a robot tool;
a robot tool, the robot tool having two ends, each end being provided with a coupling tool piece configured to interface with a said robot arm, and a roll holder shaft configured to hold a roll of packaging material, the roll holder shaft at one end being mounted substantially midway between said ends and projecting substantially perpendicular to an axis extending between said ends.

In embodiments, the robot arm is configured as an elongate beam having said coupling robot piece mounted at the end of the beam.

In embodiments, the coupling robot pieces are configured to be able to convey actuating power from a power supply line of any of said robots.

In embodiments, the coupling between said robots and said robot tool is in the form of a robot tool changer with the coupling tool pieces of the robot tool configured to be able to mate with coupling master piece mounted on each robot arm.

In embodiments, the robot arms each comprises a wrapping material clamp configured to hold a strip of wrapping material, preferably mounted close to the distal end of said robot arm.

In embodiments, the robot system further comprises:
a robot jig having a first and a second intersecting leg;
a first leg of the robot jig being configured with a first and a second robot base mounts placed apart on said first leg;
a second leg of the robot jig being configured with a first coil roller abutment placed at an end of said second leg.

In embodiments, the robot system further comprises at least one coil roller configured to give a coil placed in said first coil roller a rotating movement.

In embodiments, the robot system further comprises a wrapping material clamping station placed substantially midway between said robots, said wrapping material clamping station being provided with a wrapping material clamp configured to hold a strip of wrapping material.

In embodiments, the robot system further comprises a roll magazine for storing a plurality of rolls of wrapping material available to one or more of the robots, the roll magazine being configured with a roll place and an associated wrapping material clamp for each roll of wrapping material, said wrapping material clamps being configured to hold a strip of wrapping material.

In embodiments, the robot system further comprises a measuring system configured to measure the position and dimensions of a coil positioned on a coil roller for being packaged with a wrapping material.

In embodiments, the measuring system comprises one or more laser measuring tools, for example mounted on one of or both robot arms.

In embodiments, the robot system further comprises a robot control system configured to control the movement of the robots in relation to a coil positioned on a coil roller for being packaged with a wrapping material.

In embodiments, the robot control system comprises input/output interfaces configured to be communicatably couplable to the industrial robots, to one or more coil rollers, and/or to a human/machine interface for example in the form of a GUI generating a dashboard.

The invention claimed is:

1. A method for wrapping a coil in a robot system comprising a robot control system, a cradle for carrying the coil, two industrial robots, each industrial robot being provided with at least one robot arm having a coupling robot piece configured to interface with a robot tool having two ends with each end being configured to interface with the coupling robot piece of a respective one of the at least one robot arms, and a roll holder shaft projecting substantially perpendicular to an axis extending between said two ends and carrying a roll of wrapping material, said method comprising wrapping the coil with the wrapping material being rolled off the roll in successive wrapping turns each comprising a sequence of robot movements including two handovers of the robot tool between the two robots per wrapping turn, wherein a first handover phase takes place in a hollow cylindrical center core of the coil and a second handover phase takes place along a curved envelope surface of the coil, and wherein the application of the wrapping material to the surfaces of the coil is comprising at least one of:
 a. positioning, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and b. positioning the robot arm of the respective robots so that the longitudinal axis of the roll holder shaft of the robot tool holding the roll is directed in an inclined angular direction relative a direction of rotation of the coil, and c. moving the respective robot and robot arm holding the robot tool along the curved envelope surface so that a direction of travel for the respective robot and robot arm holding the robot tool with the roll so that the roll is travelling along the curved envelope at an angular direction within the angle range of 0.1 to 15 degrees relative an axis along the curved envelope surface which is parallel to a rotational axis of the coil.

2. The method of claim 1, wherein the application of the wrapping material to the surfaces of the coil comprises step a, and wherein said positioning of the robot arm of the first robot along and outside said first outer circumferential edge is performed during movement and while moving the robot tool with the roll holder shaft from the hollow cylindrical center core of the coil to said outer circumferential edge between a first end surface of the coil and the curved envelope surface of the coil.

3. The method of claim 1, wherein the longitudinal axis of said roll holder shaft is maintained, by the respective robots holding said roll holder shaft with the roll, in a substantially constant inclined angular direction relative the direction of rotation of the coil during the whole movement of said roll holder shaft with the roll between the two outer circumferential edges and along the curved envelope surface of the coil.

4. The method of claim 1, wherein the application of the wrapping material to the surfaces of the coil comprises step a, and wherein the position, in three-dimensional space along said circumferential edge, for starting the wrapping of the curved envelope surface is a different position in three-dimensional space relative the corresponding position along said circumferential edge for the immediately preceding wrapping turn for each of at least ten successive wrapping turns for wrapping the entire surface of the coil.

5. The method of claim 1, wherein the application of the wrapping material to the surfaces of the coil comprises step c, and wherein ending positions in three-dimensional space along a second circumferential edge between the curved envelope surface and a second end surface of the coil are mutually different for successive wrapping turns, and wherein, after having completed the wrapping of the curved envelope surface, the robot and robot arm holding the robot tool with the roll move back along the second end surface to enter the hollow cylindrical center core from the second end surface.

6. The method of claim 1, wherein the application of the wrapping material to the surfaces of the coil comprises step a, and wherein the position in three-dimensional space along said first circumferential edge is adjusted by a distance relative the corresponding position along said first circumferential edge for the immediately preceding wrapping turn which is within a distance range between 2-75% of the width of the roll of wrapping material applied to the coil.

7. The method of claim 1, wherein the application of the wrapping material to the surfaces of the coil comprises step a, and wherein the position in three-dimensional space along said first circumferential edge is adapted to the rotational speed of the coil and the travel distance of the outer peripheral surface, or curved envelope surface, of the coil to provide a desired overlap between successive passes for wrapping the curved envelope surface of the coil.

8. The method of claim 1, wherein the application of the wrapping material to the surfaces of the coil comprises step a, and wherein the longitudinal axis of the roll holder shaft of the robot tool is positioned, by the respective robot arm holding the robot tool, at an angle within an angle range of 2 to 30 degrees relative the direction of rotation of a sub-area of the curved envelope surface where the wrapping material is applied.

9. The method of claim 1, wherein the direction of travel of the robot tool and the respective robot arm holding the robot tool along the curved envelope surface is in a direction essentially parallel to the rotational axis of the coil, and wherein the longitudinal axis of the roll holder shaft of the robot tool is positioned at an angle within an angle range of 3 to 30 degrees relative the direction of rotation of a sub-area of the curved envelope surface where the wrapping material is applied.

10. The method of claim 1, wherein the direction of travel of the robot tool and the respective robot arm holding the robot tool along the curved envelope surface is in a direction along the curved envelope surface which is parallel to the rotational axis of the coil.

11. The method of claim 7, wherein the direction of travel of the robot tool and the respective robot arm holding the robot tool along the curved envelope surface is in a straight direction within the angle range of 0.1 to 15 degrees relative an axis along the curved envelope surface which is parallel to the rotational axis of the coil.

12. The method of claim 7, wherein the direction of travel of the robot tool and the respective robot arm holding the robot tool along a curved envelope surface is in a straight direction at an angle within the angle range of 0.1 to 5 degrees relative the axis along the curved envelope surface which is parallel to the rotational axis of the coil, and wherein the longitudinal axis of the roll holder shaft of the robot tool is positioned at angle within an angle range of 5 to 20 degrees relative the direction of rotation of a sub-area of the curved envelope surface where the wrapping material is applied.

13. The method of claim 7, wherein the direction of travel of the robot tool is within the angle range of 2 to 30 degrees relative the axis along the curved envelope surface which is parallel to the rotational axis of the coil, and wherein the longitudinal axis of the roll holder shaft of the robot tool is positioned at angle within an angle range of 0.1 to 10 degrees relative the direction of rotation of a sub-area of the curved envelope surface where the wrapping material is applied.

14. The method of claim 1, wherein the first handover in the hollow center core is performed having the longitudinal axis of the roll holder shaft of the robot tool positioned in a perpendicular direction to the rotational axis of the coil which is essentially parallel to the gravitational axis.

15. The method of claim 1, wherein the first handover in the hollow center core is performed while both two robot arms handing over the robot tool between them are in motion.

16. The method of claim 1, wherein the second handover phase along the curved envelope surface is performed while the two robot arms are standing still during a time period lasting less than 0.5 seconds.

17. The method of claim 1, wherein the first handover in the hollow center core is performed while the two robot arms are standing still during a time period lasting less than 0.3 seconds.

18. The method of claim 1, wherein the coupling robot piece of the robot arm is controlled by pneumatic power, and wherein the pneumatic power of the robot arm holding the robot tool is reduced or shut off at a distance from the handover position to thereby provide for a faster and more seamless handover of the robot tool.

19. The method of claim 16, wherein the pneumatic power of the robot arm holding the robot tool is reduced or shut off at a certain distance within a distance interval of 20-200 mm from the position of handover.

20. A robot system comprising a robot control system, a cradle for carrying the coil, two industrial robots, each industrial robot being provided with at least one robot arm having a coupling robot piece configured to interface with a robot tool having two ends with each end being configured to interface with a coupling robot piece of a respective one of the at least one robot arms, and a roll holder shaft projecting substantially perpendicular to an axis extending between said two ends and carrying a roll of wrapping material, wherein said robot control system is configured to control the movements of the robots in relation to the coil in order to wrap the coil with the wrapping material in successive wrapping turns each comprising a sequence of robot movements including two handovers of the robot tool between the two robots per wrapping turn where a first handover phase takes place in a hollow cylindrical center core of the coil and a second handover phase takes place along a curved envelope surface of the coil, said robot control system is further configured to control the movements of the robots and their respective robot arm so that the application of the wrapping material to the surfaces of the coil is comprising at least one of:
  a. position, in three-dimensional space along and outside a first outer circumferential edge of the coil, the robot arm of a first robot holding the robot tool with the roll of wrapping material in a different position in three-dimensional space relative a corresponding position along and outside said first outer circumferential edge for the immediately preceding wrapping turn, and
  b. positioning the robot arm of the respective robots so that the longitudinal axis of the roll holder shaft of the robot tool holding the roll is directed in an inclined angular direction relative a direction of rotation of the coil, and
  c. moving the respective robot and robot arm holding the robot tool along the curved envelope surface so that a direction of travel for the respective robot and robot arm holding the robot tool with the roll so that the roll is travelling along the curved envelope at an angular direction within the angle range of 0.1 to 15 degrees relative an axis along the curved envelope surface which is parallel to a rotational axis of the coil.

21. The robot system of claim 20, wherein said robot control system is further configured to control the position in three-dimensional space along the first outer circumferential edge of the coil to be adjusted for each of at least ten successive laps, or wrapping revolutions/passes, and to adjust said at least ten starting positions after the first handover phase and before starting the application of the wrapping material to the curved envelope surface.

22. The robot system of claim 21, wherein said robot control system is further configured to control the ending positions in three-dimensional space along a second outer circumferential edge of the coil to be mutually different for at least ten successive laps, and to control the movements of the robot tool along a second end surface so that the robot tool is positioned essentially in a center of the hollow cylindrical center core when entering the hollow cylindrical center core of the coil.

23. The robot system of claim 20, wherein said robot control system is further configured to control the position in three-dimensional space along the first outer circumferential edge of the coil where the wrapping of the curved envelope surface begins to be adjusted by a distance relative the corresponding position for the immediately preceding lap which is within a distance range between 2-75% of the width of the roll of wrapping material applied to the coil, and wherein the position is adapted to the rotational speed and distance of the outer peripheral surface, or curved envelope surface, of the coil to provide a desired overlap between successive passes for wrapping the curved envelope surface of the coil.

24. The robot system of claim 20, wherein said robot control system is further configured to control the respective robot and robot arm to position the longitudinal axis of the roll holder shaft of the robot tool, along the curved envelope surface, at an angle within an angle range of 2 to 30 degrees relative the direction of rotation of a sub-area of the curved envelope surface where the wrapping material is applied.

25. The robot system of claim 20, wherein said robot control system is further configured to control the direction of travel of the respective robot arm holding the robot tool along the curved envelope surface to be in a straight direction at an angle within the angle range of 0.1 to 15 degrees relative the axis along the curved envelope surface which is parallel to the rotational axis of the coil.

26. A non-transitory computer readable medium, comprising:
  the computer readable medium having instructions stored thereon, the instructions, when executed on at least one processor, cause the at least one processor to implement and/or send control data for controlling the sequences of robotic movements of two robots for wrapping a coil in successive wrapping laps where a first handover phase takes place in a hollow cylindrical center core of the coil and a second handover phase takes place along a curved envelope surface of the coil,
  said computer readable medium is further configured to cause at least one of the following actions to be performed by the robot and robot arm holding a robot tool with the roll of wrapping material:
  a. positioning, in three-dimensional space along and outside a first outer circumferential edge of the coil, the robot arm of a first robot holding a robot tool with the roll of wrapping material in a different position in three-dimensional space relative a corresponding position along and outside said first outer circumferential edge for the immediately preceding wrapping turn,
  b. positioning the robot arm of the respective robots so that the longitudinal axis of the shaft of the robot tool holding the roll is directed in an inclined angular direction relative a direction of rotation of the coil, wherein the longitudinal axis of the shaft of the robot tool is positioned and maintained in a substantially constant angular direction within an angle range of 2 to 30 degrees relative the direction of rotation of the coil and a sub-area of the curved envelope surface to which the wrapping material is applied, and
  c. moving the respective robot and robot arm holding the robot tool along the curved envelope surface so that a direction of travel of the roll and the respective robot arm holding the roll along the curved envelope surface is in a direction at an angle relative an axis along the curved envelope surface which is parallel to a rotational axis of the coil, wherein the direction of travel for the respective robot and robot arm holding the roll along the curved envelope is in a straight direction at an angular direction within the angle range of 0.1 to 15 degrees relative an axis along the curved envelope surface which is parallel to the rotational axis of the coil.

27. A computer program product tangibly stored on a computer readable storage medium and comprising at least one processor and instructions which, when executed on the at least one processor, cause the at least one processor to implement and/or send control data for controlling the movement paths for two robots for wrapping a coil in successive wrapping laps where a first handover phase takes place in a hollow cylindrical center core of the coil and a second handover phase takes place along a curved envelope surface of the coil and including at least one of the following actions and sequence of movements by the respective robot and robot arm holding a robot tool with a roll of wrapping material:

a. positioning, in three-dimensional space along and outside a first outer circumferential edge of the coil, the robot arm of a first robot holding the robot tool with the roll of wrapping material so that the roll is positioned in a different position in three-dimensional space relative a corresponding position along and outside said first outer circumferential edge for the immediately preceding wrapping turn, b. positioning the robot arm of the respective robots so that the longitudinal axis of the shaft of the robot tool holding the roll is directed in an inclined angular direction relative a direction of rotation of the coil, wherein the longitudinal axis of the shaft of the robot arm is positioned and maintained in a substantially constant angular direction within an angle range of 2 to 30 degrees relative the direction of rotation of the coil and a sub-area of the curved envelope surface to which the wrapping material is applied, and c. moving the respective robot and robot arm holding the robot tool along the curved envelope surface so that a direction of travel of the roll and the respective robot arm holding the robot tool with the roll along the curved envelope surface is in a direction at an angle relative an axis along the curved envelope surface which is parallel to the rotational axis of the coil, wherein the direction of travel for the respective robot and robot arm holding the robot tool with the roll along the curved envelope is in a straight direction at an angular direction within the angle range of 0.1 to 15 degrees relative an axis along the curved envelope surface which is parallel to a rotational axis of the coil.

* * * * *